(12) United States Patent
Atanasiu et al.

(10) Patent No.: US 11,636,405 B2
(45) Date of Patent: Apr. 25, 2023

(54) METHOD, APPARATUS AND COMPUTER PROGRAM PRODUCT FOR VEHICLE PLATOONING

(71) Applicant: HERE Global B.V., Eindhoven (NL)

(72) Inventors: Radu-Florian Atanasiu, Darmstadt (DE); Jeronimo Lopez-Navarro, Königstein im Taunus (DE); Jiaqing Gu, Aschaffenburg (DE); Thomas Gehrsitz, Frankfurt (DE); Sebastian Van De Hoef, Langen (DE)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/689,141

(22) Filed: Nov. 20, 2019

(65) Prior Publication Data

US 2021/0150429 A1     May 20, 2021

(51) Int. Cl.
*G06Q 10/04*     (2012.01)
*H04W 4/40*     (2018.01)
(Continued)

(52) U.S. Cl.
CPC ......... *G06Q 10/047* (2013.01); *G01C 21/343* (2013.01); *G01C 21/3469* (2013.01);
(Continued)

(58) Field of Classification Search
None
See application file for complete search history.

(56) References Cited

U.S. PATENT DOCUMENTS 8,352,111 B2   1/2013   Mudalige
8,510,029 B2   8/2013   Curtis et al.
(Continued)

FOREIGN PATENT DOCUMENTS

DE   10 2010 042089 A1   4/2012
DE   10 2016 003432 A1   10/2016
(Continued)

OTHER PUBLICATIONS

Translation of KR20190014418A (Year: 2019).*
(Continued)

*Primary Examiner* — Rachid Bendidi
*Assistant Examiner* — Selena M Jin
(74) *Attorney, Agent, or Firm* — Alston & Bird LLP

(57) ABSTRACT

A method, apparatus and computer program products are provided for generating routes for vehicles participating in a platooning plan, where the routes are influenced by one another. Methods may include receiving a first trip request including a first vehicle identification, a first trip origin, and a first trip destination; receiving a second trip request including a second vehicle identification, a second trip origin, and a second trip destination, where the first trip origin, second trip origin, first trip destination, and second trip destination are all different; generating a platooning plan that includes a first route and a second route, where the first route and the second route overlap for at least a portion of the respective route, where at least one of the first route and the second route are generated with an influence from the other of the first route and the second route.

20 Claims, 18 Drawing Sheets

(51) Int. Cl.
  *G01C 21/34* (2006.01)
  *G05D 1/02* (2020.01)
  *G08G 1/00* (2006.01)
  *G06Q 10/047* (2023.01)

(52) U.S. Cl.
  CPC ....... *G01C 21/3492* (2013.01); *G05D 1/0293* (2013.01); *G08G 1/22* (2013.01); *H04W 4/40* (2018.02)

(56) References Cited

U.S. PATENT DOCUMENTS

| | | | |
|---|---|---|---|
| 9,396,661 | B2 | 7/2016 | Okamoto |
| 9,551,993 | B2 | 1/2017 | Kolhouse et al. |
| 9,632,507 | B1 | 4/2017 | Korn |
| 9,784,587 | B1 | 10/2017 | Greenspan et al. |
| 9,940,840 | B1 | 4/2018 | Schubert et al. |
| 10,078,338 | B2 | 9/2018 | Smartt et al. |
| 2010/0256836 | A1 | 10/2010 | Mudalige |
| 2010/0256852 | A1 | 10/2010 | Mudalige |
| 2012/0086582 | A1 | 4/2012 | Durekovic et al. |
| 2014/0282093 | A1 | 9/2014 | Burke et al. |
| 2017/0115666 | A1* | 4/2017 | Kolhouse ............ G08G 1/0175 |
| 2017/0219373 | A1 | 8/2017 | DiMeo et al. |
| 2017/0236415 | A1 | 8/2017 | Okabe et al. |
| 2017/0293296 | A1 | 10/2017 | Stenneth et al. |
| 2017/0371333 | A1 | 12/2017 | Nagy et al. |
| 2018/0188745 | A1 | 7/2018 | Pilkington |
| 2018/0188746 | A1* | 7/2018 | Lesher ................. G05D 1/0287 |
| 2018/0211546 | A1 | 7/2018 | Smartt et al. |
| 2018/0356238 | A1* | 12/2018 | Berlingerio ......... G01C 21/362 |
| 2019/0016341 | A1 | 1/2019 | Nelson |
| 2019/0025821 | A1 | 1/2019 | Salomon et al. |
| 2019/0051158 | A1 | 2/2019 | Felip Leon et al. |
| 2019/0086916 | A1 | 3/2019 | Choi |
| 2019/0096265 | A1 | 3/2019 | Mok |
| 2019/0171227 | A1* | 6/2019 | Sujan .................... B60W 10/06 |
| 2019/0176783 | A1 | 6/2019 | Lim |
| 2019/0179337 | A1 | 6/2019 | Ji |
| 2019/0286120 | A1 | 9/2019 | Stenneth et al. |
| 2020/0073408 | A1 | 3/2020 | Kim et al. |
| 2020/0080853 | A1* | 3/2020 | Tam ..................... G05D 1/0212 |
| 2020/0125117 | A1 | 4/2020 | Switkes et al. |
| 2020/0300649 | A1* | 9/2020 | Kim ....................... G08G 1/202 |
| 2021/0182997 | A1 | 6/2021 | Klingemann |

FOREIGN PATENT DOCUMENTS

| | | | |
|---|---|---|---|
| EP | 3 392 856 | A1 | 10/2018 |
| EP | 3 552 071 | A1 | 10/2019 |
| KR | 20190014418 | A * | 2/2019 |
| SE | 1 651 160 | A1 | 3/2018 |
| WO | WO 2015/047179 | A1 | 4/2015 |
| WO | WO 2017/035516 | A1 | 3/2017 |
| WO | WO 2018/106774 | | 6/2018 |

OTHER PUBLICATIONS

Extended European Search Report for European Application No. 20208697.1 dated Mar. 18, 2021, 9 pages.
Electronic Horizon Software | HERE [online] [retrieved on Jan. 28, 2020]. Retrieved via the Internet: https://web.archive.org/web/20190526194539/https://www.here.com/products/automotive/electronic-horizon (MAy 26, 2019) 10 pages.
Keese, S. et al., Automated Trucks: The Next Big Disruptor in the Automotive Industry, Technical Report, Roland Berger (2016) 44 pages.
Larson, J. et al., A Distributed Framework for Coordinated Heavy-Duty Vehicle Platooning, IEEE Transactions on Intelligent Transportation Systems, vol. 16, No. 1 (Feb. 2015) 419-429.
Meisen, P. et al., A Data-Mining Technique for The Planning and Organization of Truck Platoons, [online] [retrieved on Jan. 28, 2020]. Retrieved via the Internet: https://pdfs.semanticscholar.org/d939/93c9b5fd89624b228938e5c34fb895ee8853.pdf. (2008) 270-279.
Nine U.S. States Alread Approved Full Truck Platooning: Study [online] [retrieved Jan. 28, 2020]. Retrieved via the Internet: https://web.archive.org/web/20190716005646/https://enterpriseiotinsights.com/20180821/connected-cars-2/nine-us-states-already-approved-full-truck . . . (Jul. 16, 2019) 8 pages.
Pillado et al., Cooperative Dynamic Formation of Platoons for Safe and Energy-Optimized Goods Transportation, D7.2 Limited Results of the Off-Board Platoon Coordination System via Simulation. Sompanion (Sep. 2015) 1-27 pages.
Pillado, M. et al., COMPANION—Towards Co-Operative Platoon Management of Heavy-Duty Vehicles, 2015 IEEE 18th International Conference on Intelligent Transportation Systems (2015) 1267-1273.
Platooning Together [online] [retrieved Jan. 28, 2020]. Retrieved via the Internet: https://web.archive.org/web/20190713185732/https://platooningenemble.eu/ (dated Jul. 3, 2019) 6 pages.
Van De Hoef S., Fuel-Efficient Centralized Coordination of Truck Platooning, Thesis, KTH Royal Institute of Technology, Stockholm (2016) 91 pages.
What is Truck Platooning? [online] [retrieved Jan. 29, 2020]. Retrieved via the Internet: https://www.eutruckplatooning.com/about/default.aspx (dated Sep. 10, 2019) 2 pages.
Luo, F. et al., Coordinated Platooning With Multiple Speeds, Transportation Research Part C: Emerging Technologies (2018) 34 pages.
Sokolov, V. et al., Platoon Formation Maximization Through Centralized Routing and Departure Time Coordination [online] [retrieved Jan. 28, 2020]. Retrieved from the Internet: https://arxiv.org/pdf/1701.01391.pdf (dated Jun. 2017) 15 pages.
Van de Hoef, S., Coordination of Heavy-Duty Vehicle Platooning, Doctoral Thesis, KTH Roval institute of Technology, Stockholm (2018) 186 pages.
Van de Hoef, S. et al., Fuel-Optimal Centralized Coordination of Truck Platooning Based on Shortest Paths, (2015) 6 pages.
Extended European Search Report for European Application No. 20208754.0 dated Apr. 30, 2021, 8 pages.
Non-Final Office Action for U.S. Appl. No. 16/689,162 dated Jun. 4, 2021.
Non-Final Office Action for U.S. Appl. No. 16/689,168 dated Jun. 22, 2021.
Extended European Search Report for European Application No. 20208611.2 dated Mar. 22, 2021, 9 pages.
Non-Final Office Action for U.S. Appl. No. 16/689,158 dated Aug. 18, 2021.
Final Office Action for U.S. Appl. No. 16/689,158 dated Mar. 4, 2022.
Advisory Action for U.S. Appl. No. 16/689,158 dated May 26, 2022.
Advisory Action for U.S. Appl. No. 16/689,162 dated Mar. 7, 2022.
Advisoty Action for U.S. Appl. No. 16/689,168 dated Mar. 25, 2022.
Non-Final Office Action for U.S. Appl. No. 16/689,168 dated May 10, 2022.
Extended European Search Report for European Application No. 20208687.2 dated Mar. 24, 2021, 9 pages.
Final Office Action for U.S. Appl. No. 16/689,162 dated Dec. 20, 2021.
Final Office Action for U.S. Appl. No. 16/689,168 dated Dec. 17, 2021.
Office Action for European Application No. 20208697.1 dated Feb. 8, 2022, 5 pages.
Final Office Action for U.S. Appl. No. 16/689,168 dated Nov. 8, 2022.
Non-Final Office Action for U.S. Appl. No. 16/689,158 dated Sep. 16, 2022.
Non-Final Office Action for U.S. Appl. No. 16/689,162 dated Sep. 15, 2022.
Office Action for European Application No. 20208687.2 dated Nov. 14, 2022, 7 pages.

(56) References Cited

OTHER PUBLICATIONS

Bhoopalam et al., "Planning of Truck Platoons: A Literature Review and Directions for Future Research", Transportation Research Part B: Methodological, vol. 107, (Jan. 2018), 17 pages.
Office Action for European Application No. 20208611.2 dated Dec. 15, 2022, 9 pages.

* cited by examiner

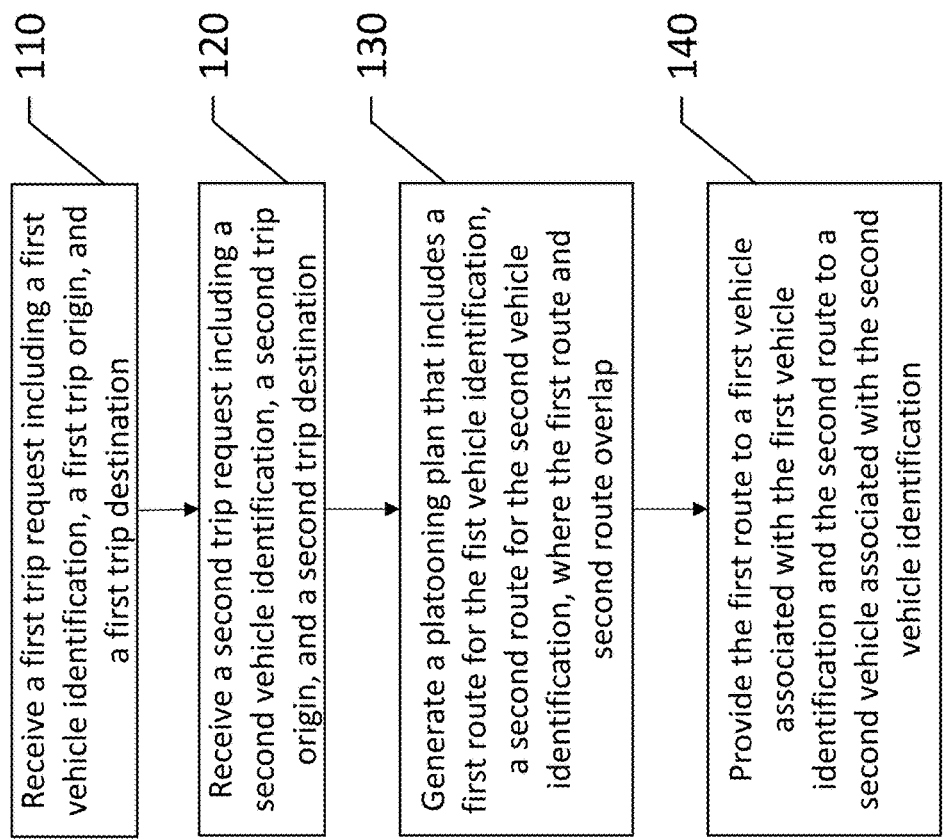

METHOD, APPARATUS AND COMPUTER PROGRAM PRODUCT FOR VEHICLE PLATOONING

TECHNOLOGICAL FIELD

Embodiments of the present invention relate generally to a method, apparatus, and computer program product for providing information for the operations of platoons including routing of a group of vehicles to include platooning, and more particularly, to multi-vehicle aware routing and scheduling for platoon formation and optimization.

BACKGROUND

The number of vehicles on roadways is increasing at a rate that outpaces the construction of new roadways and additional roadway capacity. Further, budget constraints limit the ability to construct new roadways and to handle the aging roadway infrastructure presently in place. To address the challenges posed by the growing traffic volumes and a lack of resources or ability to widen or add roadways, alternative measures for increasing efficiency of existing roadways is needed. Instead of adding new roadways or adding vehicle lanes to existing roadways, methods of increasing the efficiency of use of existing roadways can reduce traffic congestion, increase roadway safety, and prolong the life of existing roadway infrastructure.

Along with volume comes greater energy consumption for vehicles traveling along road networks. Vehicle manufacturers strive to improve vehicle efficiency through costly developments and advances. The efficiency of vehicles can be further improved based on use, such as through using more efficient driving habits and cooperating to improve vehicle efficiency through platooning of vehicles. Platooning involves vehicles traveling together in formation, such as in a "platoon" formation where vehicles typically follow one another in a line. Platooning, as described herein, involves vehicles operating together in a formation to improve overall efficiency of the platooning vehicles, such as through close following and steady-state operating speeds as frequently as possible. However, platooning can be complex and difficult to implement in an efficient manner.

BRIEF SUMMARY

A method, apparatus and computer program product are therefore provided according to an example embodiment of the present disclosure for generating routes for a plurality of vehicles including joining the vehicles to a platoon along at least a portion of their routes, where the routing for the vehicles is generated with an awareness of the other vehicles of the group. Methods may include: receiving a first trip request including a first vehicle identification, a first trip origin, and a first trip destination; receiving a second trip request including a second vehicle identification, a second trip origin, and a second trip destination, where the first trip origin is different from the second trip origin, and where the first trip destination is different than the second trip destination; generating a platooning plan that includes a first route associated with the first vehicle identification and a second route associated with the second vehicle identification, where the first route and the second route overlap for at least a portion of the respective route, where at least one of the first route and the second route are generated with an influence from the other of the first route and the second route; and providing the first route to a vehicle associated with the first vehicle identification and the second route to a vehicle associated with the second vehicle identification.

Methods may include providing for route guidance of the first vehicle along the first route and the second vehicle along the second route. The platooning plan may include a joining location where the first route begins to overlap the second route. The platooning plan may include a departing location where the first route ceases to overlap the second route. The platooning plan may include a schedule including a departure time for the first route, a departure time for the second route, and a joining time, where the joining time is a scheduled time of arrival of the first vehicle and the second vehicle at the joining location.

According to some embodiments, receiving an indication that at least one of the first vehicle and the second vehicle is deviating from the first route or the second route, or a schedule associated with a respective one of the first route or the second route; generating a revised platooning plan that includes a first revised route associated with the first vehicle identification and a second revised route associated with the second vehicle identification; and providing the revised first route to the first vehicle and the revised second route to the second vehicle. A projected efficiency of the first vehicle along the first route is lower than a projected efficiency of the first vehicle along a first direct route between the first trip origin and the first trip destination, where a projected efficiency of the second vehicle along the second route is higher than a projected efficiency of the second vehicle along a second direct route between the second trip origin and the second trip destination, and where a cumulative projected efficiency of the first vehicle along the first route and the second vehicle along the second route is higher than a cumulative projected efficiency of the first vehicle along the first direct route and the second vehicle along the second direct route.

Embodiments provided herein may include an apparatus having at least one processor and at least one memory including computer program code. The at least one memory and the computer program code configured to, with the processor, cause the apparatus to at least: receive a first trip request including a first vehicle identification, a first trip origin, and a first trip destination; receive a second trip request including a second vehicle identification, a second trip origin, and a second trip destination, where the first trip origin is different from the second trip origin, and where the first trip destination is different from the second trip destination; generate a platooning plan that includes a first route associated with the first vehicle identification and a second route associated with the second vehicle identification, where the first route and the second route overlap for at least a portion of the respective route, where at least on of the first route and the second route are generated with an influence from the other of the first route and the second route; and provide the first route to a vehicle associated with the first vehicle identification and the second route to a vehicle associated with the second vehicle identification.

The apparatus of some embodiments may be caused to provide for route guidance of the first vehicle along the first route and the second vehicle along the second route. The platooning plan may include a joining location where the first route begins to overlap the second route. The platooning plan may include a departing location where the first route ceases to overlap the second route. The platooning plan may include a schedule including a departure time for the first route, a departure time for the second route, and a joining time, where the joining time is the scheduled time of arrival of the first vehicle and the second vehicle at the joining location.

The apparatus of some embodiments may be caused to: receive an indication that at least one of the first vehicle and the second vehicle is deviating from the first route or the second route, or a schedule associated with a respective one of the first route or the second route; generate a revised platooning plan that includes a first revised route associated with the first vehicle identification and a second revised route associated with the second vehicle identification; and provide the revised first route to the first vehicle and the revised route to the second vehicle. A projected efficiency of the first vehicle along the first route may be lower than a projected efficiency of the first vehicle along a first direct route between the first trip origin and the first trip destination, where a projected efficiency of the second vehicle along the second route is higher than a projected efficiency of the second vehicle along a second direct route between the second trip origin and the second trip destination, and where a cumulative projected efficiency of the first vehicle along the first route and the second vehicle along the second route is higher than a cumulative projected efficiency of the first vehicle along the first direct route and the second vehicle along the second direct route.

Embodiments provided herein may include a computer program product including at least one non-transitory computer-readable storage medium having computer-executable program code portions stored therein. The computer-executable program code portions including program code instructions to: receive a first trip request including a first vehicle identification, a first trip origin, and a first trip destination; receive a second trip request including a second vehicle identification, a second trip origin, and a second trip destination, where the first trip origin is different from the second trip origin, and where the first trip destination is different from the second trip destination; generate a platooning plan that includes a first route associated with the first vehicle identification and a second rout associated with the second vehicle identification, where the first route and the second route overlap for at least a portion of the respective route, where at least one of the first route and the second route are generated with an influence from the other of the first route and the second route; and provide the first route to a vehicle associated with the first vehicle identification and the second route to a vehicle associated with the second vehicle identification.

Embodiments may include program code instructions to: provide for route guidance of the first vehicle along the first route and the second vehicle along the second route. The platooning plan may include a joining location where the first route begins to overlap the second route. The platooning plan may include a departing location where the first route ceases to overlap the second route. The platooning plan may include a schedule including a departure time for the first route, a departure time for the second route, and a joining time, where the joining time is a scheduled time of arrival of the first vehicle and the second vehicle at the joining location. Embodiments may include program code instructions to: receive an indication that at least one of the first vehicle and the second vehicle is deviating from the first route or the second route, or a schedule associated with a respective one of the first route or the second route; generate a revised platooning plan that includes a first revised route associated with the first vehicle identification and a second revised route associated with the second vehicle identification; and provide the revised first route to the first vehicle and the revised second route to the second vehicle.

Embodiments may provide an apparatus, the apparatus including: means for receiving a first trip request including a first vehicle identification, a first trip origin, and a first trip destination; means for receiving a second trip request including a second vehicle identification, a second trip origin, and a second trip destination, where the first trip origin is different from the second trip origin, and where the first trip destination is different than the second trip destination; means for generating a platooning plan that includes a first route associated with the first vehicle identification and a second route associated with the second vehicle identification, where the first route and the second route overlap for at least a portion of the respective route, where at least one of the first route and the second route are generated with an influence from the other of the first route and the second route; and means for providing the first route to a vehicle associated with the first vehicle identification and the second route to a vehicle associated with the second vehicle identification.

An apparatus of example embodiments may include means for providing for route guidance of the first vehicle along the first route and the second vehicle along the second route. The platooning plan may include a joining location where the first route begins to overlap the second route. The platooning plan may include a departing location where the first route ceases to overlap the second route. The platooning plan may include a schedule including a departure time for the first route, a departure time for the second route, and a joining time, where the joining time is a scheduled time of arrival of the first vehicle and the second vehicle at the joining location.

According to some embodiments, the apparatus may include means for receiving an indication that at least one of the first vehicle and the second vehicle is deviating from the first route or the second route, or a schedule associated with a respective one of the first route or the second route; means for generating a revised platooning plan that includes a first revised route associated with the first vehicle identification and a second revised route associated with the second vehicle identification; and means for providing the revised first route to the first vehicle and the revised second route to the second vehicle. A projected efficiency of the first vehicle along the first route is lower than a projected efficiency of the first vehicle along a first direct route between the first trip origin and the first trip destination, where a projected efficiency of the second vehicle along the second route is higher than a projected efficiency of the second vehicle along a second direct route between the second trip origin and the second trip destination, and where a cumulative projected efficiency of the first vehicle along the first route and the second vehicle along the second route is higher than a cumulative projected efficiency of the first vehicle along the first direct route and the second vehicle along the second direct route.

BRIEF DESCRIPTION OF THE DRAWINGS

Figure 1:
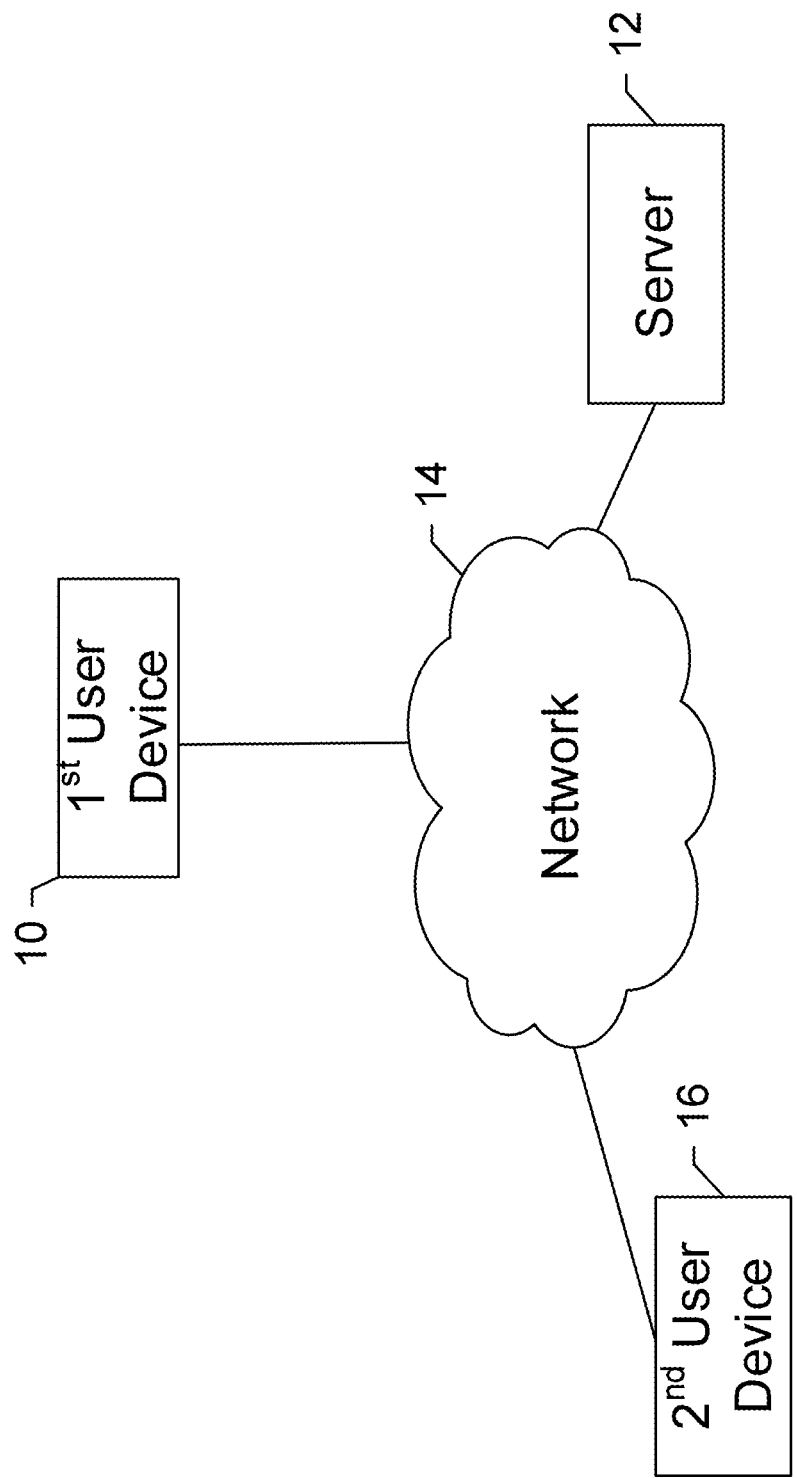
Figure 2:
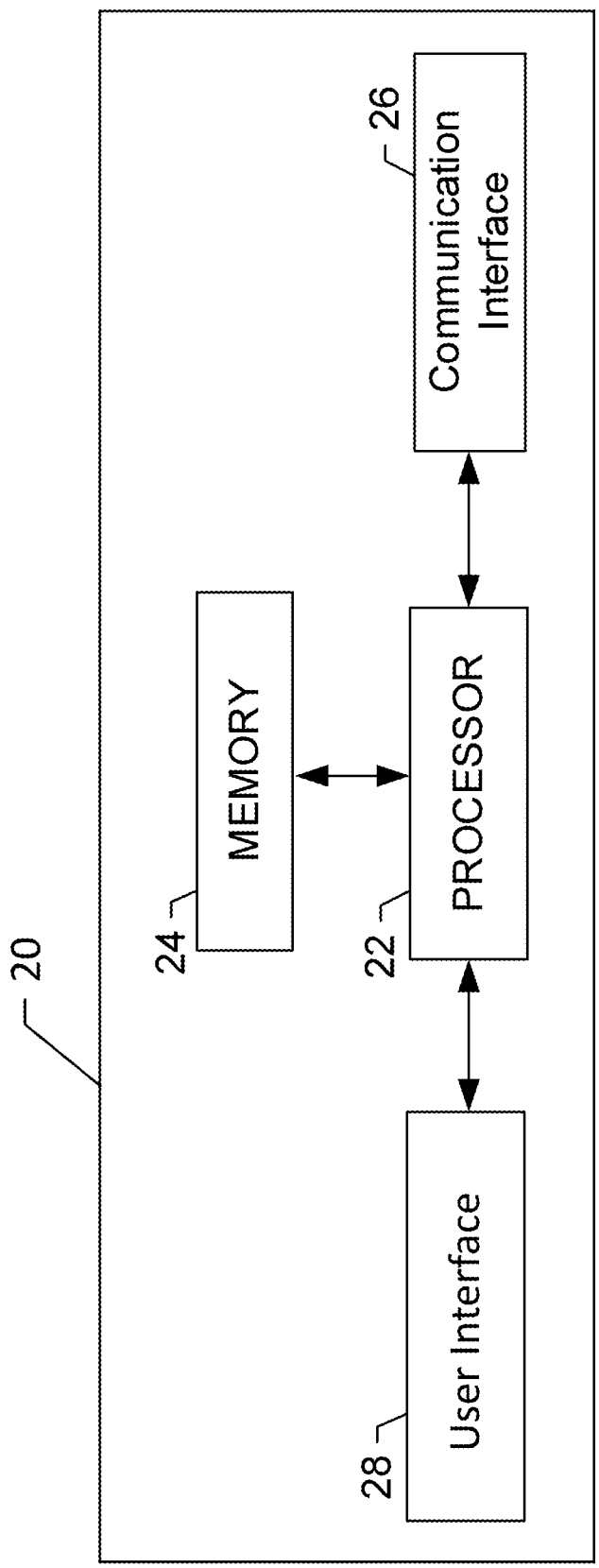
Figure 3:
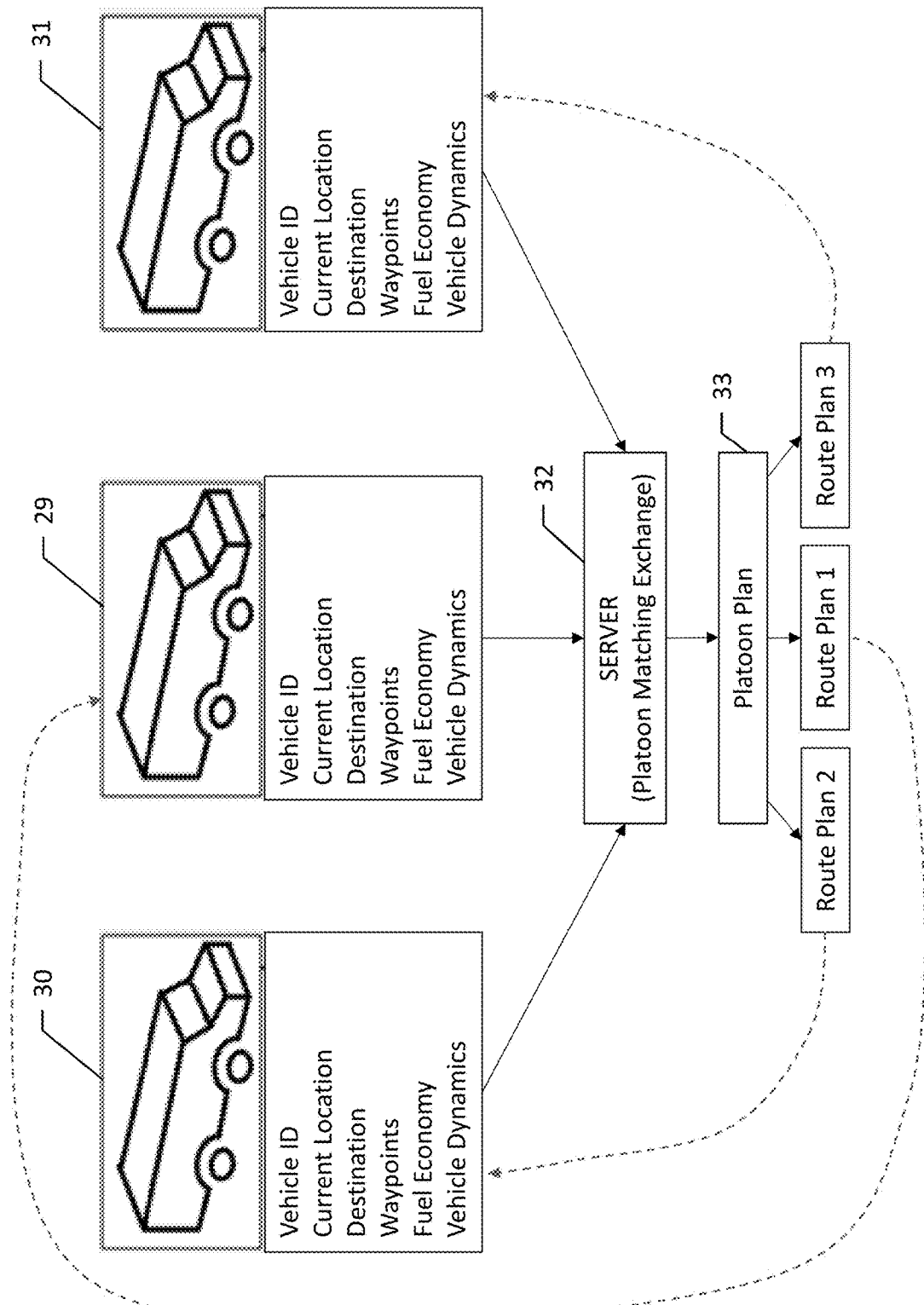
Figure 4:
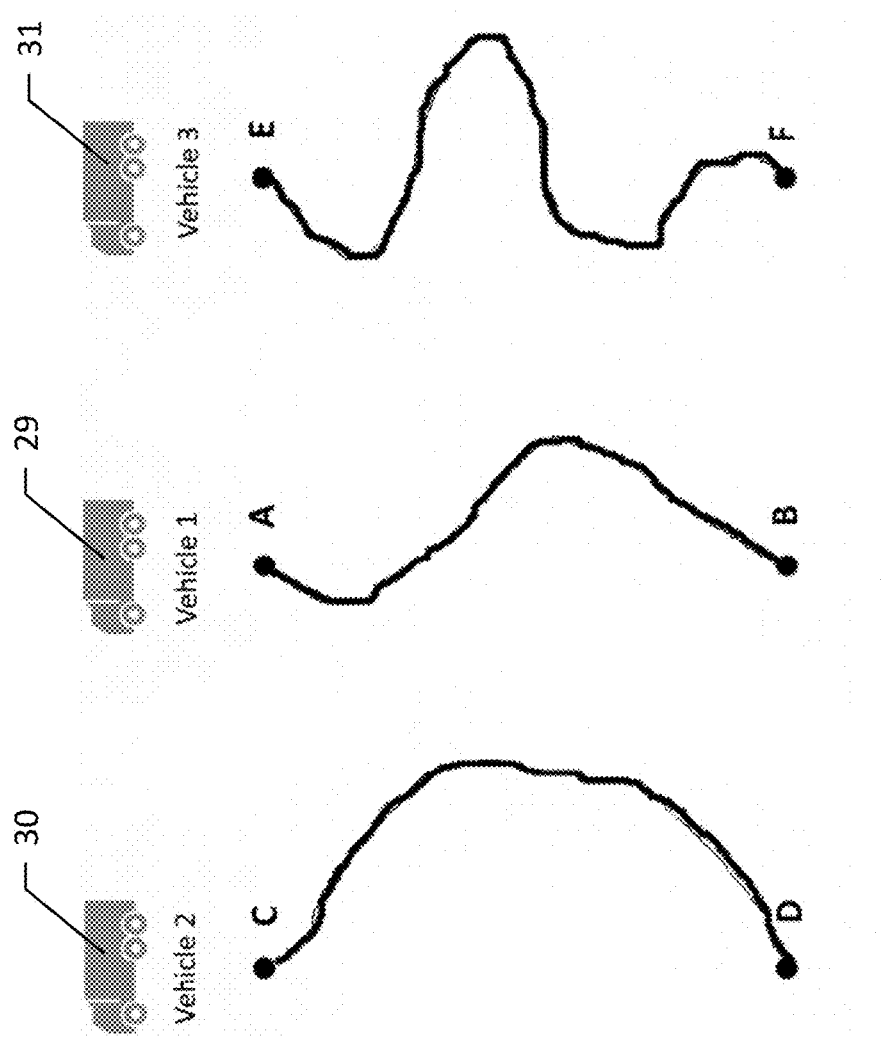
Figure 5:
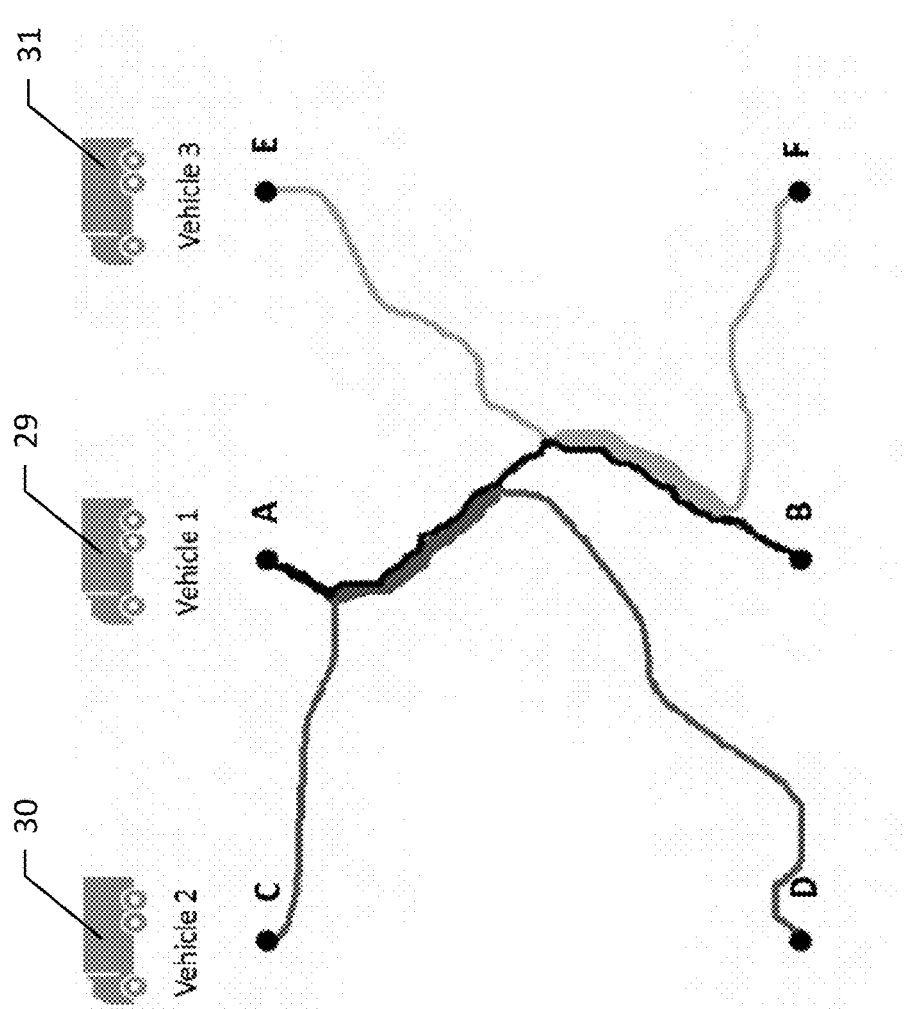
Figure 6:
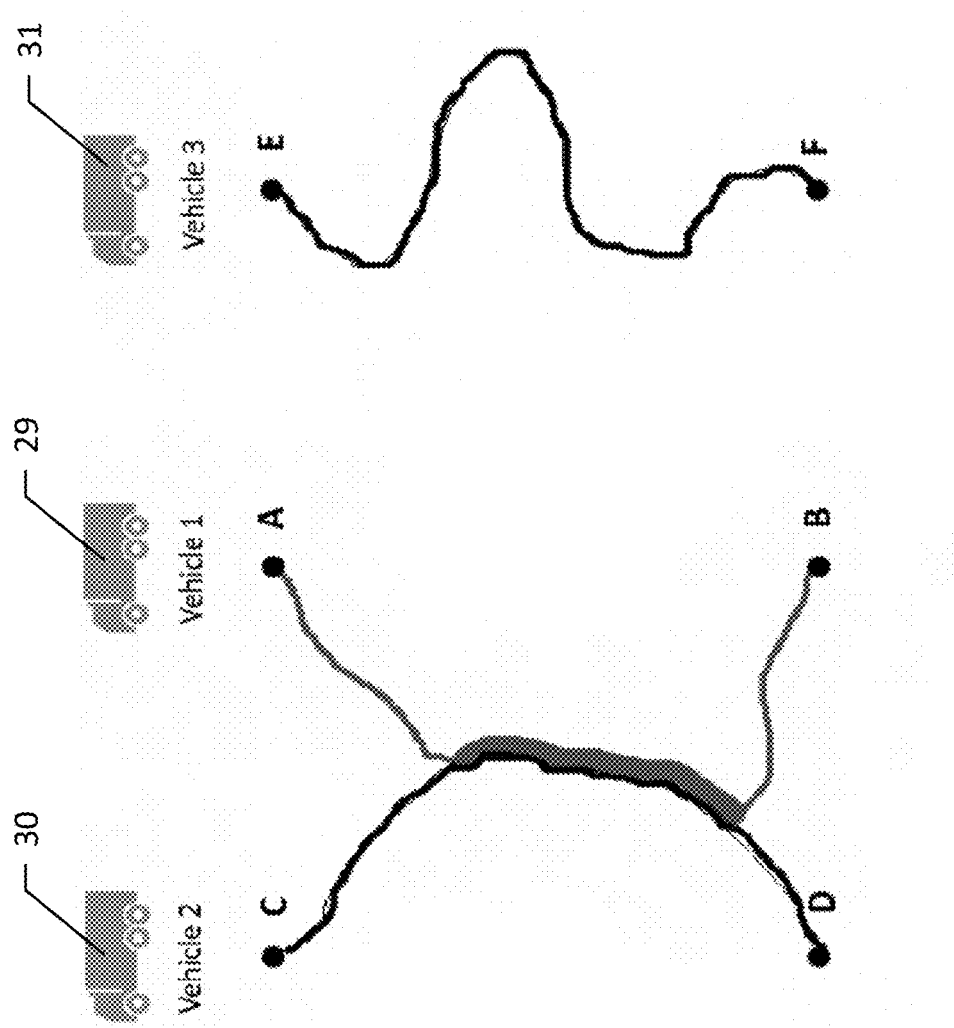
Figure 7:
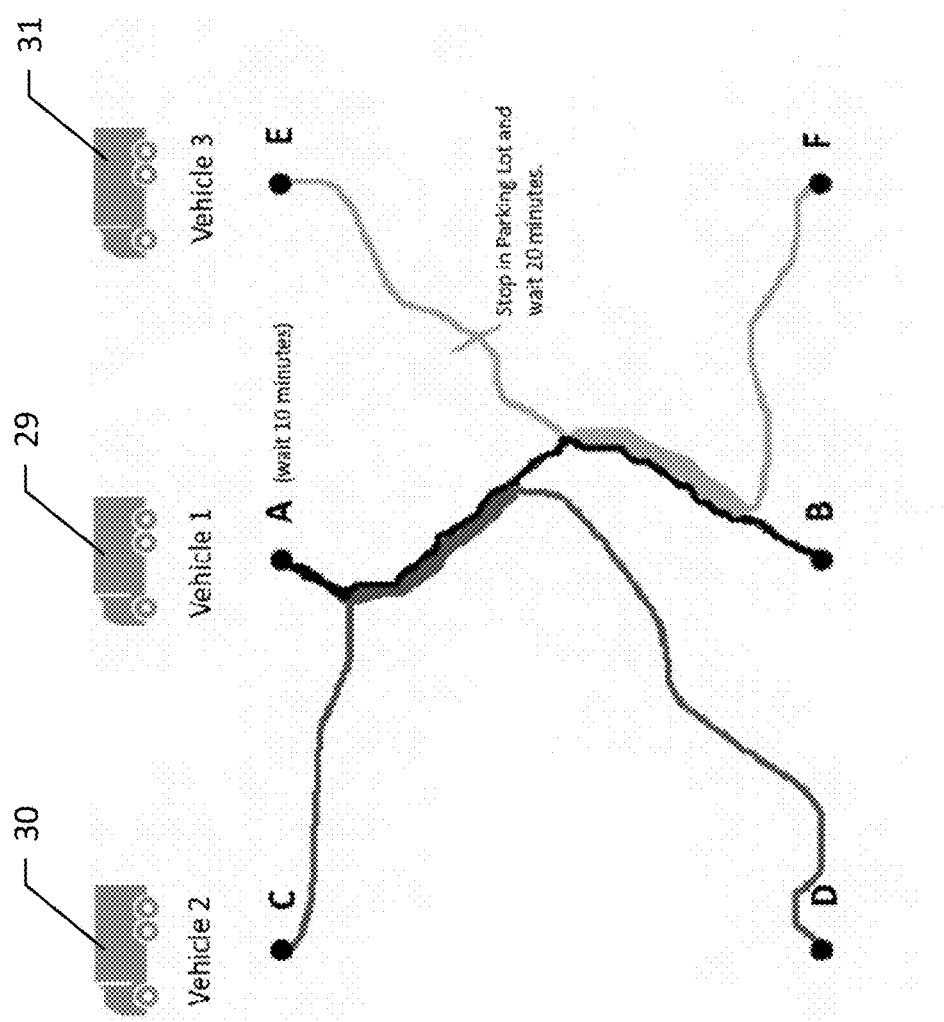
Figure 8:
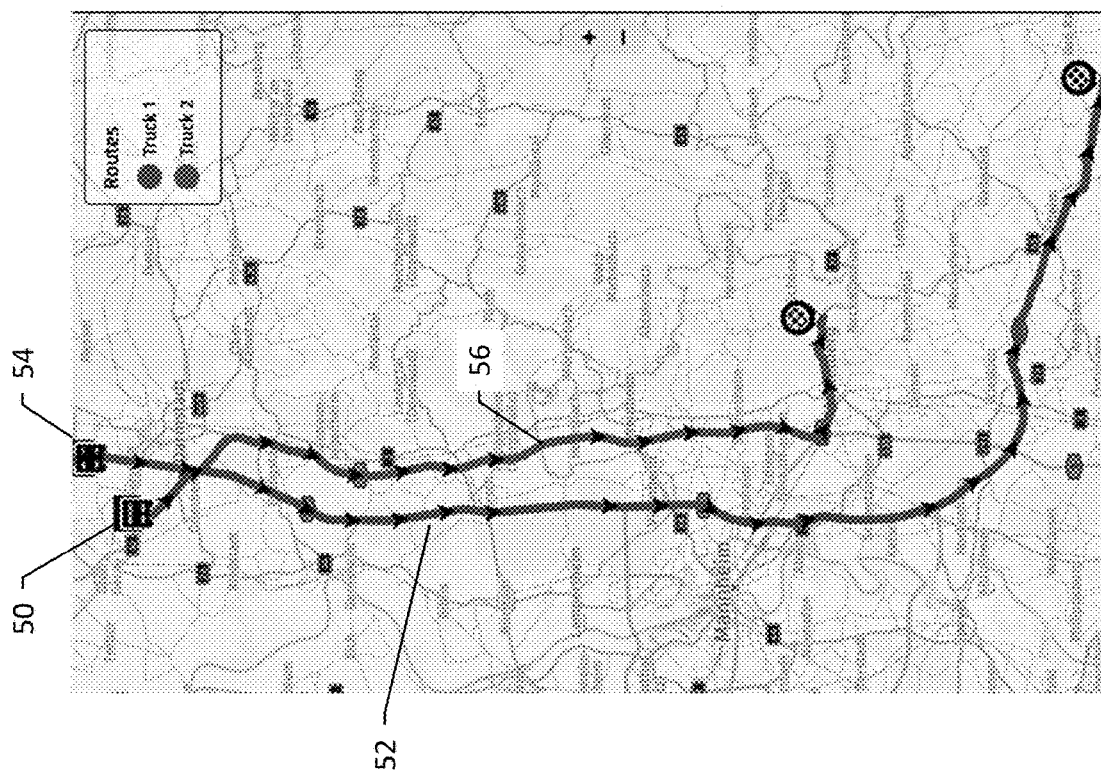
Figure 9:
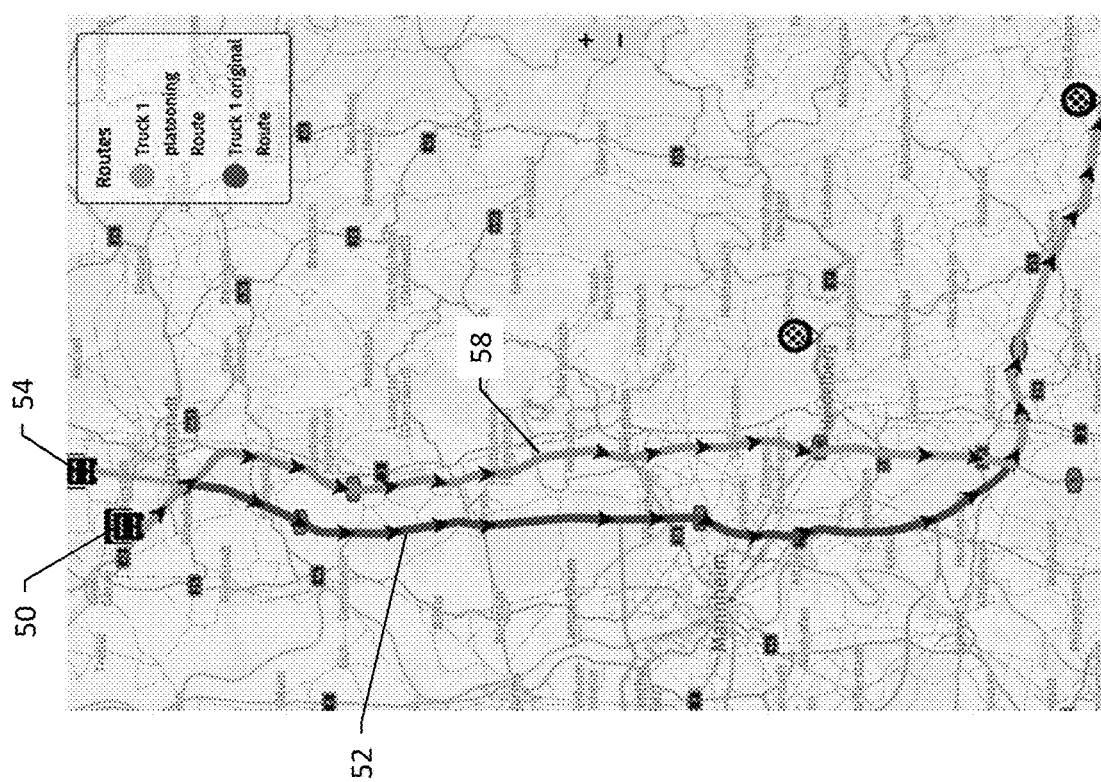
Figure 10:
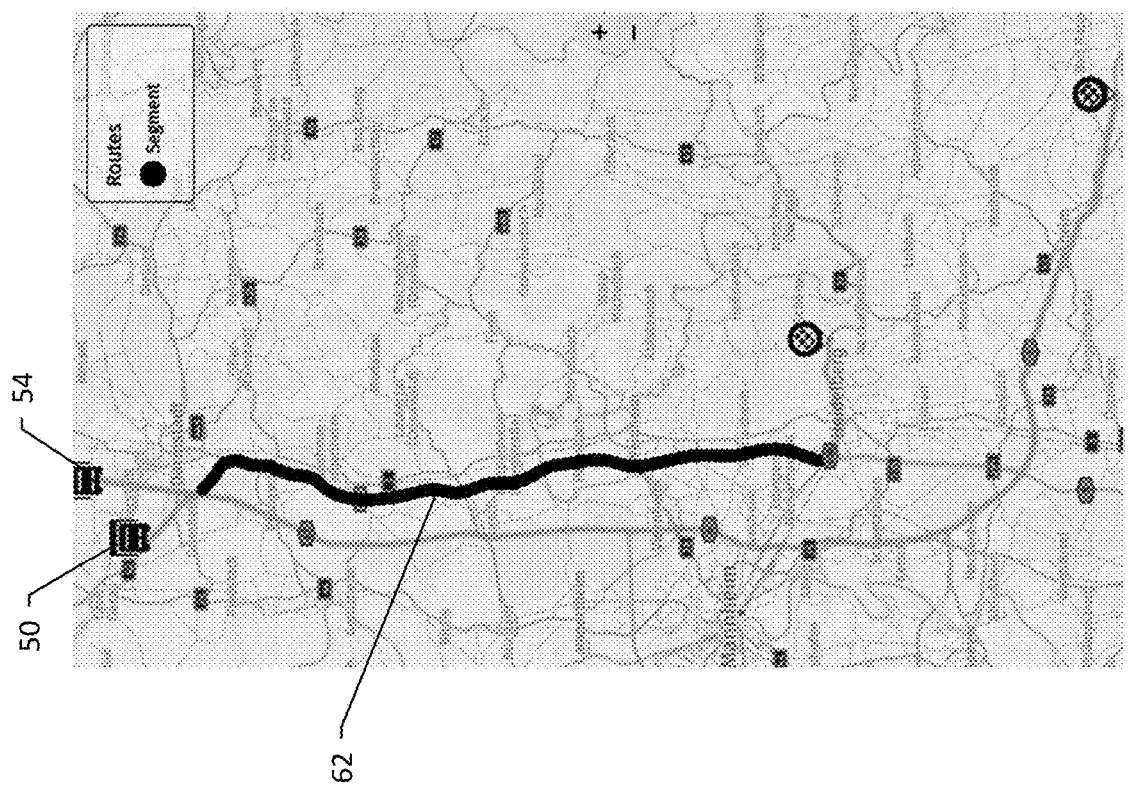
Figure 11:
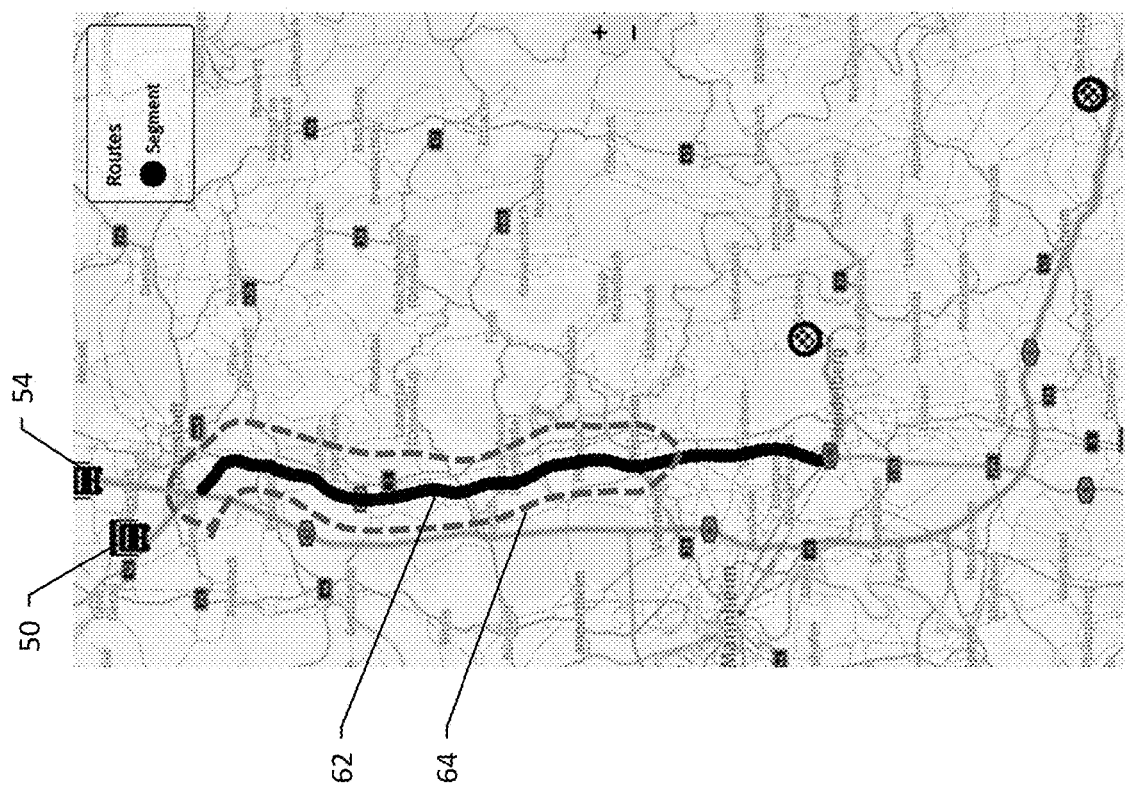
Figure 12:
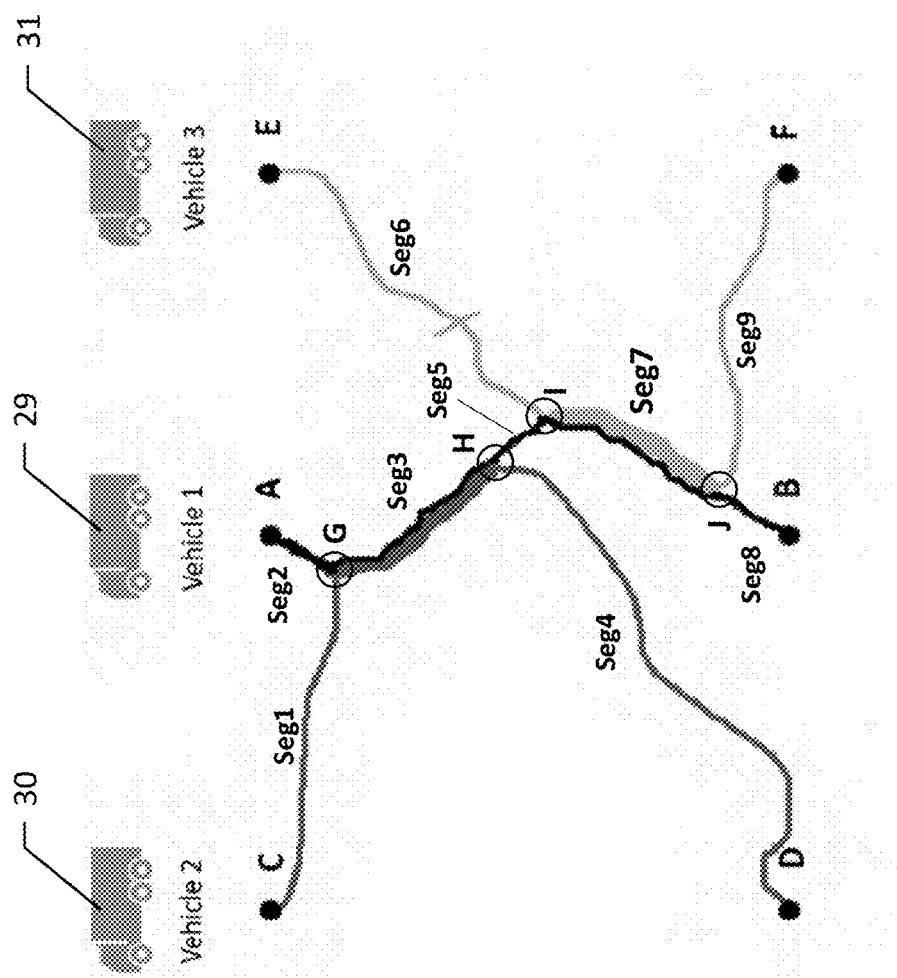
Figure 13:
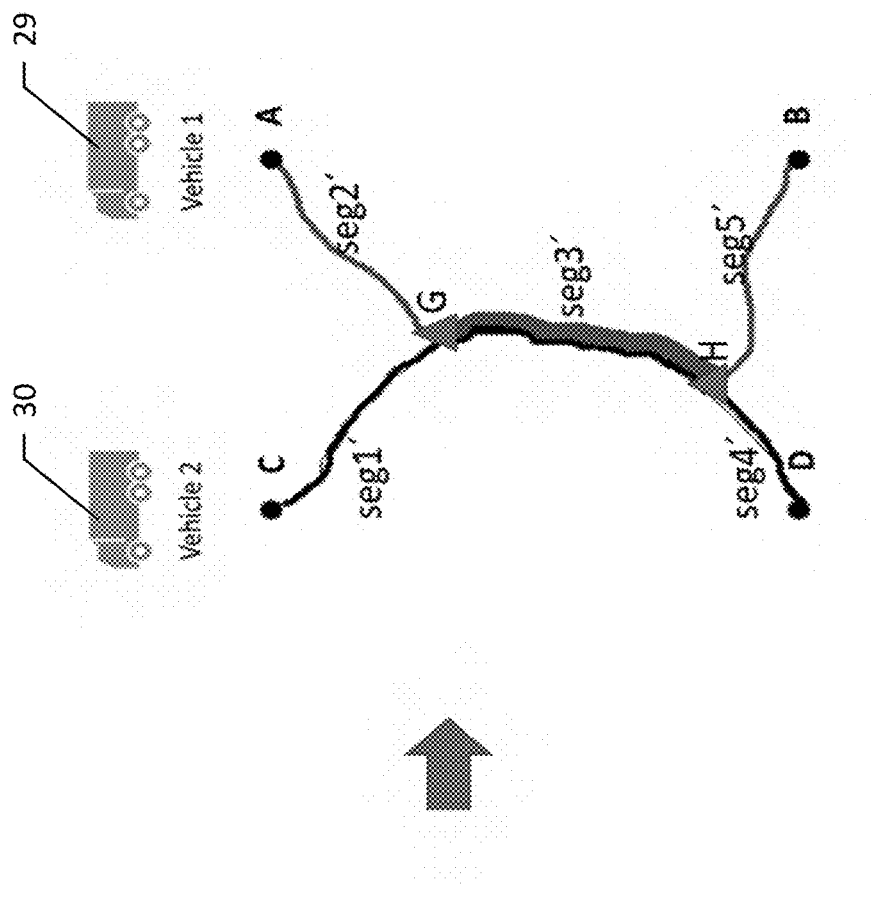
Figure 13:
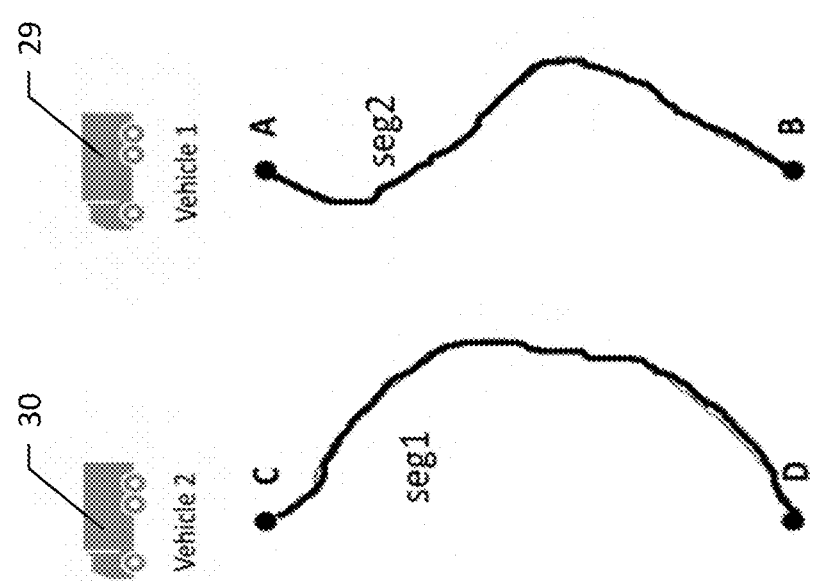
Figure 14:
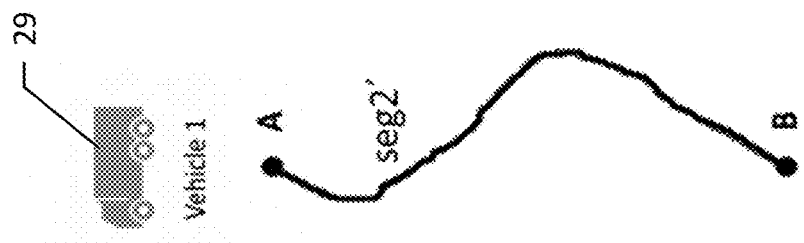
Figure 14:
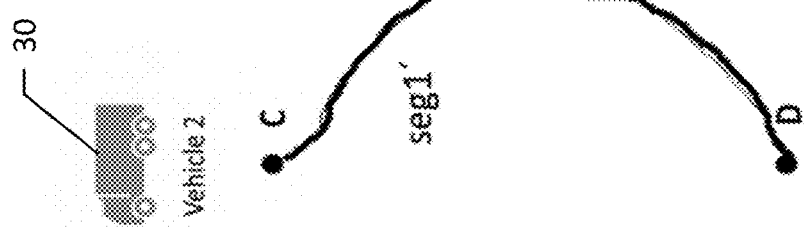
Figure 14:
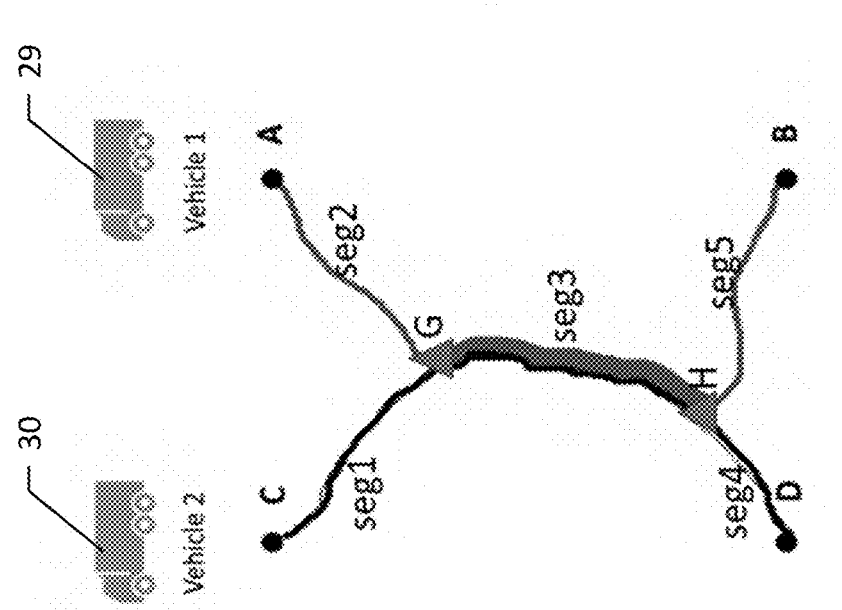
Figure 15:
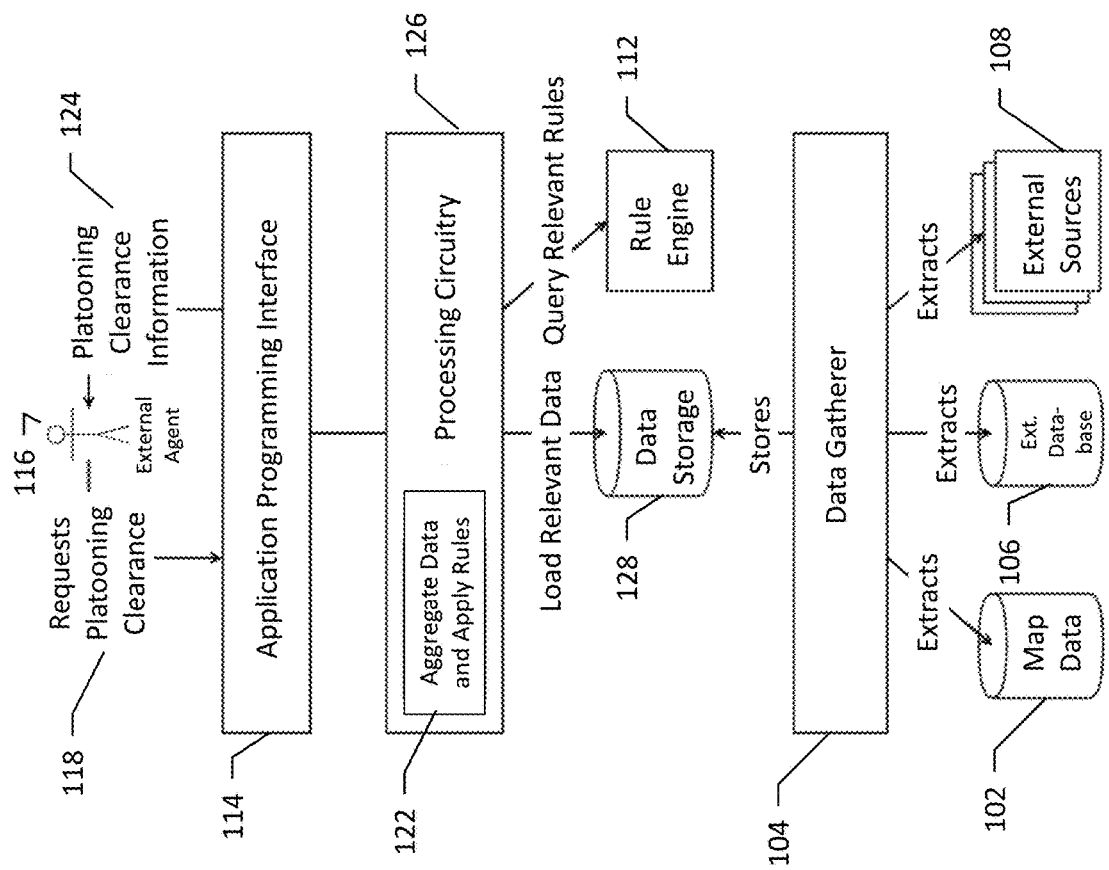
Figure 16:
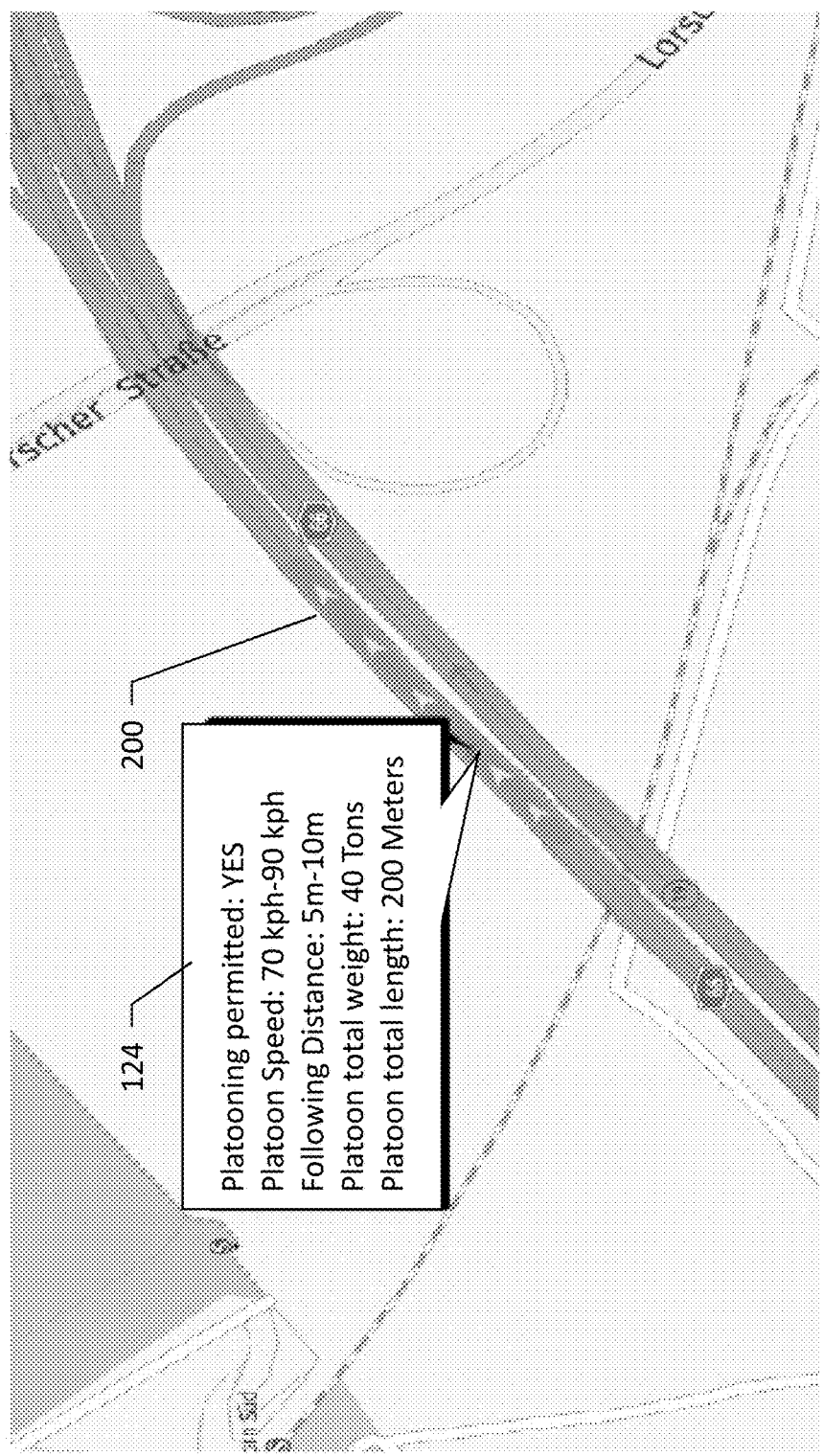
Figure 17:
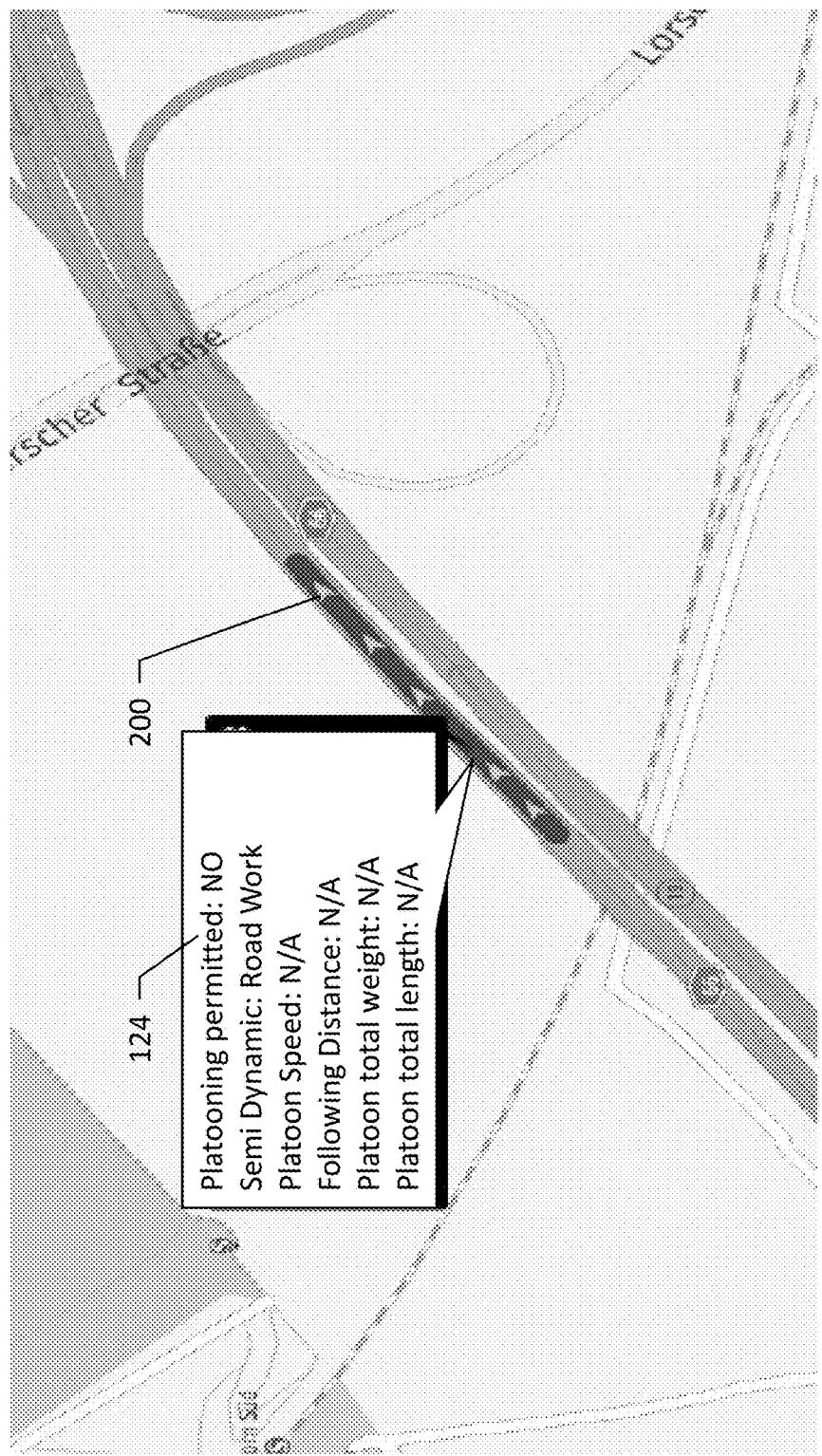

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present disclosure;

FIG. 2 is a block diagram of an apparatus that may be specifically configured in accordance with an example embodiment of the present disclosure;

FIG. 3 is an illustration of a plurality of vehicles providing trip requests to a platoon server in order to facilitate the formation of a platoon according to an example embodiment of the present disclosure;

FIG. 4 illustrates three vehicles and their respective routes between respective origins and destinations according to an example embodiment of the present disclosure;

FIG. 5 depicts a platooning plan for the three vehicles of FIG. 4 to maximize efficiency according to an example embodiment of the present disclosure;

FIG. 6 illustrates another platooning plan for the three vehicles of FIG. 4 to maximize efficiency for another scenario according to an example embodiment of the present disclosure;

FIG. 7 illustrates the platooning plan of FIG. 5 including additional instructions for the respective vehicles for participating in the platooning plan according to an example embodiment of the present disclosure;

FIG. 8 illustrates a map including two vehicles and their respective routes between respective origins and destinations according to an example embodiment of the present disclosure;

FIG. 9 depicts a platooning plan for one of the vehicles of FIG. 8 versus the vehicle's original route according to an example embodiment of the present disclosure;

FIG. 10 illustrates the platooning segment of the routes for the vehicles of FIG. 8 according to an example embodiment of the present disclosure;

FIG. 11 illustrates a platoon joining location search boundary for the platooning segment of FIG. 10 according to an example embodiment of the present disclosure;

FIG. 12 depicts the platooning plan of FIG. 5 including segmentation points and segments according to an example embodiment of the present disclosure;

FIG. 13 illustrates the formation of segments of a platooning plan according to an example embodiment of the present disclosure;

FIG. 14 illustrates the de-segmentation of a platooning plan in response to a platooning plan being canceled according to an example embodiment of the present disclosure;

FIG. 15 illustrates architecture for generating platooning clearance information according to an example embodiment of the present disclosure;

FIG. 16 depicts a method of communicating platooning clearance information to a user according to an example embodiment of the present disclosure;

FIG. 17 depicts a method of communicating platooning clearance information to a user according to another example embodiment of the present disclosure; and FIG. 18 is a flowchart for facilitating platooning according to an example embodiment of the present disclosure.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored.

In general, some embodiments presented herein are directed to grouping vehicles together into platoons for travel from an origin to a destination across a transportation network. A route may be defined as a path between a particular origin and a particular destination, where multiple routes may exist between those same origin and destination points. A trip may be a particular route taken by a vehicle between an origin and a destination. Thus, while a route is not vehicle specific, each trip is necessarily specific to the vehicle making that trip. Further, while example embodiments described herein may be directed primarily toward vehicles such as cars, trucks, and buses, traveling along roadways, example embodiments may be implemented for vehicles such as trains, aircraft, boats, or the like. While the benefits of the invention described herein with regard to road-going vehicles supports increased efficiency of vehicles traveling along an existing network of roads, implementations of the invention may provide improved air-traffic safety and a reduction in air-traffic congestion, or similar benefits among water vessels or vehicles traveling along railways.

Grouping vehicles into platoons is a method that may increase the capacity of a network of roadways while also providing benefits to the vehicles of the platoon. A platoon of vehicles may be a group of vehicles that travel with a predefined distance or range of distance between them, and in some cases, vehicles may be coupled to one another via mechanical means or via electrical/computer-based means such as an "electronic tow-bar". Electrical or computer-based means for coupling vehicles may be performed through partial automation with adaptive cruise control that helps a driver maintain a safe distance from a leading vehicle, or full automation such as with driverless vehicles that follow a lead vehicle without driver input. When groups of vehicles are assembled into platoons, many benefits may be achieved. One benefit may include improved energy efficiency of the vehicles involved through less unnecessary braking resulting in accordion-like fluctuations in traffic and increased fuel efficiency achieved by following vehicles drafting behind leading vehicles (e.g., reducing the forces caused by drag). Road capacity may increase as a result of grouping vehicles into platoons as following distances or time-gaps between vehicles may be reduced, while vehicle speeds may be more consistent (e.g., less stop-and-go). Grouping vehicles into platoons may also increase safety through more consistent traffic flow and less individual driver responsibility.

As noted above, grouping of vehicles into platoons may be achieved in vehicles having no automation, such as conventional, human-driven automobiles, vehicles having partial automation, such as a human driver with driver assistance software features (e.g., adaptive cruise control), vehicles having full automation where they are driven via computer without requiring a driver, or any combination thereof. The maximum benefit of grouping of vehicles may be achieved when vehicles are fully automated to be driven by computers as vehicle-to-vehicle communications may allow shorter following distances between vehicles and communication of vehicles within one platoon to vehicles within another platoon. Example embodiments described herein may use computers and computer program products to facilitate the grouping of vehicles into platoons, and in the case of fully autonomous, driverless vehicles, may also control the vehicles to join them to platoons. In either scenario, an apparatus that supports communication between vehicles may be used to facilitate the joining and departing of vehicles from platoons, along with determining the appropriate platoon for a vehicle to join.

Referring now of FIG. 1, a system that supports communication, typically wirelessly, between a first user device 10, a second user device 16, and a server 12 or other network entity (hereinafter generically referenced as a "server") is illustrated. As shown, the user devices and the server may be in communication via a network 14, such as a wide area network, such as a cellular network or the Internet or a local area network. However, the user devices and the server 12 may be in communication in other manners, such as via direct communications between a user device (e.g. user device 10 or 16) and the server 12, or direct communications between the user devices 10 and 16.

The user devices 10 and 16 may be embodied by a number of different devices including mobile computing devices, such as a personal digital assistant (PDA), mobile telephone, smartphone, laptop computer, tablet computer, vehicle navigation system, infotainment system, in-vehicle computer, or any combination of the aforementioned, and other types of voice and text communications systems. The server 12 may also be embodied by a computing device and, in one embodiment, is embodied by a web server. Additionally, while the system of FIG. 1 depicts a single server and two user devices, the system may include any number of servers and user devices, which may operate independently or collaborate to support activities of the user devices.

Regardless of the type of device that embodies the user devices 10 or 16, the user devices may include or be associated with an apparatus 20 as shown in FIG. 2. In this regard, the apparatus 20 may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device 24 may include, for example, one or more volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the apparatus 20 to carry out various functions in accordance with an example embodiment of the present invention. For example, the memory device 24 could be configured to buffer input data for processing by the processor 22. Additionally or alternatively, the memory device could be configured to store instructions for execution by the processor.

The processor 22 may be embodied in a number of different ways. For example, the processor 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor 22 may include one or more processors configured in tandem via the bus to enable independent execution of instructions, pipelining and/or multithreading.

In an example embodiment, the processor 22 may be configured to execute instructions stored in the memory device 24 or otherwise accessible to the processor 22. Alternatively or additionally, the processor 22 may be configured to execute hard coded functionality. As such, whether configured by hardware or software methods, or by a combination thereof, the processor 22 may represent an entity (e.g., physically embodied in circuitry) capable of performing operations according to an embodiment of the present invention while configured accordingly. Thus, for example, when the processor 22 is embodied as an ASIC, FPGA or the like, the processor 22 may be specifically configured hardware for conducting the operations described herein. Alternatively, as another example, when the processor 22 is embodied as an executor of software instructions, the instructions may specifically configure the processor 22 to perform the algorithms and/or operations described herein when the instructions are executed. However, in some cases, the processor 22 may be a processor of a specific device (e.g., a head-mounted display) configured to employ an embodiment of the present invention by further configuration of the processor 22 by instructions for performing the algorithms and/or operations described herein. The processor 22 may include, among other things, a clock, an arithmetic logic unit (ALU) and logic gates configured to support operation of the processor 22. In one embodiment, the processor 22 may also include user interface circuitry configured to control at least some functions of one or more elements of the user interface 28.

Meanwhile, the communication interface 26 may include various components, such as a device or circuitry embodied in either hardware or a combination of hardware and software that is configured to receive and/or transmit data between a computing device (e.g. user device 10 or 16) and a server 12. In this regard, the communication interface 26 may include, for example, an antenna (or multiple antennas) and supporting hardware and/or software for enabling communications wirelessly. Additionally or alternatively, the communication interface 26 may include the circuitry for interacting with the antenna(s) to cause transmission of signals via the antenna(s) or to handle receipt of signals received via the antenna(s). For example, the communications interface 26 may be configured to communicate wirelessly with a head-mounted display, such as via Wi-Fi™ (e.g., vehicular Wi-Fi™ standard 802.11p), BLUETOOTH™, mobile communications standards (e.g., 3G, 4G, or 5G) or other wireless communications techniques. In some instances, the communication interface 26 may alternatively or also support wired communication. As such, for example, the communication interface 26 may include a communication modem and/or other hardware/software for supporting communication via cable, digital subscriber line (DSL), universal serial bus (USB) or other mechanisms. For example, the communication interface 26 may be configured to communicate via wired communication with other components of a computing device.

The user interface 28 may be in communication with the processor 22, such as the user interface circuitry, to receive an indication of a user input and/or to provide an audible, visual, mechanical, or other output to a user. As such, the user interface 28 may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface 28 may also be in communication with the memory 24 and/or the communication interface 26, such as via a bus.

The communication interface 26 may facilitate communication between different user devices and/or between the server 12 and user devices 10 or 16. The communications interface 26 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, a mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Example embodiments described herein may implement a method of grouping vehicles together in a platoon that is facilitated by a server (e.g. a platoon matching exchange server 32 as shown in FIG. 3), which may be remotely located from one or all of the vehicles of a platoon, or the grouping of vehicles together may be facilitated exclusively between user devices (e.g., the first user device 10 and the second user device 16), operating collaboratively as collaborating devices, or where one device operates as the master user device while other user devices operate as slave devices. The user devices may be mobile devices within a vehicle, the navigation system of a vehicle, or integrated with vehicle controls such as in an autonomous, driverless vehicle. The user devices may be configured with hardware and software to facilitate reliable vehicle-to-vehicle communication. The communication may be performed via communications interface 26 of apparatus 20 as described above, and the user devices may use one or more communication protocols.

In the interest of safety, redundant communication protocols may be used to ensure reliable, consistent communication between devices. For example, while two vehicles may be in communication with each other (e.g., the respective user devices of each vehicle are in communication with one another) via a 4G communication protocol using cellular phone towers as communication access points. Upon entry into a tunnel, the 4G communication may be compromised. A secondary communication protocol, such as a near-field communication protocol (e.g., Bluetooth™) may be used to supplement the 4G communication protocol in the event 4G communications are lost or compromised. In this manner, communication between vehicles may be maintained.

Grouping of vehicles into platoons may require advanced knowledge of an intended destination or waypoint for a vehicle. Routes may be planned in advance in response to a user providing an indication of a destination. An origin can be identified by the current location of a user/vehicle, or independently entered by a user if different than their location when selecting the destination. Embodiments described herein may implement a central, cloud-based platoon matching exchange, which may be hosted by a server (e.g. server 12 or platoon matching exchange server 32), which could continually ingest origins, destinations, and acceptable parameters of a trip for a particular vehicle in order to appropriately match each vehicle with a platoon that would most appropriately and efficiently align with the user's planned trip. Parameters for a trip may include, for example, waypoints, types of roadways (e.g., avoiding interstate highways or preferring interstate highways), other vehicles making the trip associated with the user (e.g., if a company has a fleet of vehicles traveling on a given road network sharing routes of the trips partially or entirely), timing of the trip (e.g., departure or desired arrival) etc. The trip parameters including origin and destination may be used by the platoon matching exchange to align vehicles with suitable platoons. The destination of the vehicle can be inputted or derived from historic vehicle sensor data. Trip parameters for a given vehicle may optionally include a planned route, planned stops, expected speed, current position, fuel economy, vehicle dynamics properties (e.g., size, shape, frontal area, drag coefficient, weight, etc.), and preferences regarding a platoon. Each of these trip preferences may be broadcast to a server (e.g. server 12 or platoon matching exchange server 32) over a secure network link together with the trip requirements (origin, destination, and possibly time of departure or arrival).

Routes for each vehicle of a group may be planned based on a variety of influencing factors to facilitate navigation between an origin and a destination. A route, in the context of this application, is a set of instructions guiding a human or automated driving system from a start location or origin to a destination in a road network. The route may be represented by a sequence of road links, one or more of which compose a segment representing a road segment. A waypoint may be a place, such as a town, point-of-interest, or other location such as a street address through which a user wants to travel or at which a user intends to stop during a journey to an ultimate destination. Waypoints, as described herein, are locations that do not include the origin or destination, but are locations along a route or points along the route at which an event may occur, such as a join event or a leave event to or from a platoon. A route may include any number of waypoints or may include no waypoints.

Routing is the process of computing a route. In the current context, the defined route is intended to be used (driven) by vehicles that depart from the origin in order to arrive at the destination within given time constraints. Identifying a shortest route along a road network is a task that needs to be solved in order to generate a route. This problem is ubiquitous and significant development has occurred to establish efficient algorithms. One such algorithm is the Dijkstra algorithm that solves the shortest path problem with high efficiency. The routing problem may be modelled as finding a path in a graph data structure such that Dijkstra's algorithm can be applied to route computation. The unique structure of road networks and the relatively slow rate of infrastructure change may allow for further optimization by pre-processing the road network data and specialized heuristics. Many variations of the routing problem exist beyond the shortest path routing. Alternative routes may be established to include an optimal order to visit a set of waypoints (e.g., the traveling salesman problem), real-time routing, optimal efficiency routing (e.g., shortest time vs. shortest distance), etc.

A routing engine may include a system or software that receives as inputs a route specification and computes a route matching that specification. Such systems may be hosted on a server (e.g., server 12 or platoon matching exchange server 32) and may provide an application programming interface (API) to access the system. The routing engine may use a database containing detailed information that is required to enable a computer to generate a high-quality driving route between two locations. The information may include items such as road geometry, street names, addresses, speed limits, turn restrictions, one-way restrictions, road levels, and roadway connections.

Vehicle routing is generally ego-centric in that the routing considers factors such as traffic, weather, or other road conditions to determine an optimal route for a single vehicle between a specified origin and destination. Other existing or potential vehicle routes do not influence how the route is computed. While traffic may represent other vehicles driving at a particular time, it is their presence that influences an ego-centric route, and not the route of any other vehicles. In other words, it is not the route of any vehicles traveling among a road network that defines the traffic which influences routing decisions, it is their location on the road network and the volume of vehicles that facilitates traffic-aware routing. Thus, traffic-aware routing does not consider other routes, but instead traffic congestion among the road network. However, for fleets of vehicles, particularly commercial vehicles, embodiments described herein provide benefits of a routing engine operating on a group of vehicles where routing is aware of the other vehicles and their respective origins and destinations. In order to find an efficient route not only for a single vehicle, but for a fleet of vehicles, routes may be optimized for an explicit set of vehicles, while taking into account a collaboration dimension through platoon formations. A routing engine of example embodiments does not focus only on optimizing a single vehicle's route, but instead considers the other vehicles and produces routes that are enhanced by traveling in a platoon with other vehicles.

For commercial vehicles, such as trucks and larger vehicles that generally consume more energy (e.g., gas, electrical, etc.) than a typical passenger vehicle, platooning can significantly reduce the cost of operation due to a multitude of direct factors, such as reduced aerodynamic drag to improve fuel consumption, or due to other indirect factors such as driver cost reduction or improved driver safety due to automation or partial automation. While all vehicles may be able to benefit from platooning, vehicles with higher baseline energy consumption may realize greater absolute efficiency improvements rendering platooning even more viable. Embodiments described herein analyze driving schedules and routes for multiple vehicles in fleets or groups in order to meet and form platoons to maximize efficiency while also meeting routing constraints, such as origin and destinations, available time windows for departure, and available time windows for arrival at the destination.

Embodiments described herein provide a computer system, such as the server 12 of FIG. 1 or platoon matching exchange server 32 of FIG. 3, which allows simultaneous routing information for a group of vehicles in order to maximize key performance indicators relevant to platooning, such as but not limited to, time spent in platoons or distance driven in platoons, by offering routing and scheduling information as well as data about platoon meeting and break-up points. Rather than conventional routing that focuses on a single vehicle with a single origin and destination (and possibly waypoints for that vehicle), embodiments described herein generate routes for groups of vehicles that, when followed, attempt to maximize the cost savings at a fleet level instead of a single vehicle level. The cost savings may come from the optimization of platooning related key performance indicators such as maximizing the time or distance spent in a platoon whereby efficiencies are improved.

Embodiments include a system, embodied on a server (e.g., server 12 and/or platoon matching exchange server 32) that receives as input data needed for routing a plurality of vehicles and outputs a set of routes and schedules along with information about meeting and break-up points of vehicles in order to facilitate platoon formation. Embodiments optimize the returned routes and schedules in such a way that the cost savings for the entire system or for parts of the system (e.g., for certain specified fleets) are maximized. The maximization of platooning time and/or distance is presumed to lead to increased cost savings and efficiencies, as observed through fuel or energy savings achieved by vehicles driving in platoons due to reduced drag. Other factors may intervene as well, but may be regulatory and economic decisions, such as decrease of driver costs, insurance premium reductions, etc. These factors, along with other key performance indicators can be used to optimize the routing of the plurality of vehicles such that a symbiotic relationship is achieved among the vehicles, and benefits are realized by individual vehicles and/or by fleet operators that operate multiple vehicles. According to an example embodiment in which a fleet operator operates multiple vehicles that are to be routed together to cooperate in a platoon for at least a portion of the route, one vehicle may not realize any improvement in efficiency or may even see a slight degradation in efficiency at the expense of other vehicles in the platoon which do benefit and see improved efficiencies as a result of the platooning plan. As such, the overall efficiency of the group may be of greater importance than the individual vehicles. This embodiment may further be applied to vehicles that are not part of a fleet, but that are part of a community of vehicles, whereby even if a particular vehicle does not realize efficiency improvements, the community may compensate that vehicle for its contributions to the efficiency improvements to the community, such as through an application which provides payments or credits to a vehicle that sacrificially improved the efficiencies of other vehicles.

FIG. 3 illustrates an example embodiment in which three vehicles 29, 30, 31 are planning routes from their respective current locations to their respective destinations. The routing requests may include waypoints, fuel economy (e.g., a baseline non-platooning fuel economy), and vehicle characteristics (e.g., size, shape, frontal area, drag coefficient, weight, etc.). Each vehicle 29, 30, 31 may provide an indication of a routing request to the platoon matching exchange server 32. The routing requests may include vehicle identifiers and their respective route parameters (origin, destination, waypoints) and vehicle dynamics. The platoon matching exchange server 32 may then generate a platooning plan 33. The platooning plan generation will be described further below; however, it includes individual route plans for each vehicle. As shown, Route Plan 1 is provided to vehicle 29, Route Plan 2 is provided to vehicle 30, and Route Plan 3 is provided to vehicle 31. The vehicles may each be provided with a route plan which may be in the form of route guidance, where route guidance not only provides navigational information to follow a route, but also provides information pertaining to platooning and vehicle control. For example, route guidance may include joining locations where the vehicle may join or form a platoon. Route guidance may also include platooning parameters, such as following distance or time gap, speed restrictions, or other information to facilitate travel along the route.

A routing request where platooning is not considered, such as a conventional routing request may include where a server receives a route request from a vehicle and consider traffic data, road conditions, weather, etc. The server may further consider routing constraints such as time of departure, time window of arrival, shortest, fewest tolls, road regulation requirements (e.g., hazardous cargo, height restrictions, width restrictions, etc.). A routing engine of the server, such as processor 22, may generate a route for the vehicle individually. FIG. 4 illustrates routes for such an embodiment in which first vehicle 29 is routed from origin A to destination B, second vehicle 30 is routed from origin C to destination D, and third vehicle 31 is routed from origin E to destination F.

Embodiments described herein operate in a different manner such that the vehicles may cooperate in a symbiotic relationship and provide an improved overall efficiency of the vehicles participating in a platoon for at least a portion of their route. According to an example embodiment, a first vehicle 29 submits a routing request to platoon matching exchange server 32, as shown in FIG. 3. The routing engine of the platoon matching exchange server 32 considers: road conditions, traffic data, road topography, weather, etc. The routing engine further considers routing constraints, such as time window of departure, time window for arrival, shortest, fewest highways, fewest tolls, etc. The routing engine may further consider road regulations for platooning, such as whether platooning is allowed on a road section or what the requirements are for platooning, such as but not limited to: total platoon weight, distance between vehicles, minimum speeds, maximum speeds, etc. A route may be generated for the first vehicle 29 in a similar manner as that of FIG. 4 taking the same path. Similar routing requests may be received from a second vehicle 30 and a third vehicle 31. The routing engine considers existing routes, which in this case include the first vehicle's route between origin A and destination B, along with the other routing considerations described above. The routing engine outputs routes for the second vehicle 30 and the third vehicle 31, which both include a platooning portion where they join the first vehicle 29 along a portion of its route, as illustrated in FIG. 5. This route may provide an improvement in efficiency to one or more vehicles involved in the platooning, and the overall efficiency of the three vehicles traveling between their respective origins and destinations is estimated to be greater using the platooning plan of FIG. 5 than the individual routing plans of FIG. 4.

While the example embodiment of the routing plans for the three vehicles of FIG. 5 indicates that all three vehicles share at least a portion of a route with another vehicle and form platoons along those shared portions, embodiments described herein may establish, such as by platoon matching exchange server 32 using a routing engine, that combining the routes of all three vehicles may not result in an improvement of efficiency either to the group of vehicles overall, or to a single vehicle. As such, the most efficient routing plan may not include platooning among all three vehicles. FIG. 6 illustrates that the first vehicle 29 joins the second vehicle 30 for a platoon along a portion of the route of the second vehicle, while the third vehicle 31 travels along its own route without platooning since platooning is estimated to not provide any efficiency improvement.

A platooning plan including routes for vehicles participating in the platooning plan may include routes that are not necessarily the most efficient or fastest for an individual vehicle if it was traveling on its own. For example, the routes shown in FIG. 4 may be established independently of one another such as "direct routes", such that they consider the efficiency of routing a single vehicle between an origin and a destination. That efficiency may be in the form of the fastest route, the least expensive route (e.g., including tolls and/or from a fuel economy perspective), the most preferred route (e.g., due to travel restrictions), or any combination thereof. Optionally, the efficiency may be based on a user-preferred route, where user-defined costs may be considered and weighted accordingly, such as if a user defines travel time as most critical while defining monetary cost (e.g., tolls) as least critical, then a short toll route may be the user-preferred route. However, when a platooning plan is generated for the vehicles, at least one vehicle that participates in the platooning may be routed along a route that is not the "direct route" or most efficient for that vehicle if it were travelling on its own. In this manner, the cooperative platooning plan described herein may not simply consider what is most efficient for each vehicle, but what is most efficient for a fleet or vehicle community.

Cooperative routing of multiple vehicles into platoons along portions of their routes may be challenging as timing and schedules of vehicles traveling along the routes may render joining of vehicles to a platoon difficult. While route guidance may enable the requested slowing or speeding up of a vehicle traveling along a route in order to intersect another route at a predefined time at which a platoon may be joined, the speeding up or slowing down of a vehicle may be limited as the vehicle must still travel at a safe speed along the route. As such, embodiments described herein may introduce temporary stops to hold a vehicle at a location in order to ensure arrival of that vehicle at a platoon joining location at a prescribed time. FIG. 7 illustrates such an embodiment where the third vehicle 31 is instructed to stop in a parking lot or rest stop and wait twenty minutes before proceeding along its route in order to meet the first vehicle 29 along its route to form a platoon.

An example embodiment of a dispatcher workflow is herein described with respect to three vehicles, such as vehicles 29, 30, and 31. While embodiments are described with respect to three vehicles, embodiments may be implemented for any number of vehicles. According to an example embodiment, a fleet dispatcher may be a person that has the role of dispatching vehicles of a fleet in order to transport goods or people to destinations. The fleet dispatcher may plan the routes of three vehicles, such as the first vehicle 29 from point A to point B, the second vehicle 30 from point C to point D, and the third vehicle 31 from point E to point F. As described herein, generating the routes at a server may consider traffic data, road conditions, road topography, weather, etc. The routing may further consider routing constraints such as time window of departure, time window for arrival, etc. Further, the routing may consider road regulations for platooning, such as whether platooning is allowed along a road section or what are the allowed parameters for platooning, such as number of vehicles, total platoon weight, distance between vehicles, etc. Using this input information, a routing request may be submitted for each of the first, second, and third vehicle 29, 30, 31 at the same time to the platoon matching exchange server 32 as shown in FIG. 3. The routing engine may output platooning routes and schedules for each of the vehicles and share or transmit the routes to the vehicles. The routes generated in the platoon plan 33 may provide at least one route for at least one of the vehicles that is different than if a route request was submitted for the vehicle without concern for platooning or without awareness of the other two vehicles. In this manner, the vehicles involved in the route request from the server influence the routes of one another in forming a platoon for at least a portion of the route.

Embodiments described herein may include a planning scenario in which a list of driving routes and schedules for a set of vehicles that, at any given time of the interval covered by the scenario, specifies information about the vehicles including position, direction, speed, etc., and foreseen road information. A state of the system is to be determined according to the following information, including: positions, routes, schedules, and routing constraints of the vehicles, along with road information which may include road conditions, traffic, weather, regulatory constraints, etc. Once the vehicles of a given planning scenario begin to follow their respective routes in the platooning plan, at any given moment the current state of the system is following the state specified within the planning scenario. However, an event can occur which is a deviation of the current state of the system relative to a planning scenario. At a given time, state deviation could mean a deviation such as: road status information has changed (e.g., there is a traffic jam affecting one or more vehicle routes) or new restrictions for platooning are in place. Deviations may include that new vehicles with respective driving routes and schedules may be entered into the system.

An event may trigger the system to recompute a planning scenario in order to maximize the platooning key performance indicators which may be optimized to improve cost savings across the fleet of vehicles. The event may result in one or more of: a new route and/or a new schedule. Further, the system may compute new platooning plans for the affected vehicles that must implement the changes. The system may compute these changes continuously on every event and create or update existing plans until the starting time of one of the vehicles is close enough so that the planning (e.g., the routing and timing details) for a route is locked. On further planning iterations, the route and schedule details of those locked routes will not be changed any further but held fixed. New routes and schedules may be communicated by the system either directly to the vehicles as shown in FIG. 3, or to a dispatcher who may then decide whether to submit the new information to the vehicles in order to implement the changes.

Events may optionally include one or more vehicles that are at different points than specified in the platooning plan, such as when a vehicle is late. Embodiments provided herein may continuously or periodically monitor the status of vehicles as to a location, speed, heading, etc. and compare that status with the planned status of the platoon plan generated as described above. In the case of an event, one vehicle that is driving can be re-routed or re-scheduled if the efficiency advantages of the platooning plan would be diminished or lost based on the event. Platooning plans can change based on a preference of a server (e.g. platoon matching exchange server 32) which may be dictated by a fleet operator or by a community of drivers. The preferences may include how to handle different types of events, and to what degree of flexibility may be offered by platooning plans, such as how long one or more vehicles may wait or deviate from an original platooning plan in the event of a delay of another of the vehicles in the platooning plan.

Embodiments described herein provide a mechanism by which platooning may be made more accessible and available for vehicles. By considering the planned routes of a multitude of vehicles, platooning opportunities may be identified and routes may be altered to capitalize on platooning opportunities that would otherwise not be available if a vehicle was routed independently. Therefore, embodiments of the present disclosure may improve the likelihood of platooning through a measurable improvement in efficiency through symbiotic planning of vehicles in a fleet or a community in order to benefit the whole of the fleet or community through cooperation among vehicles.

Establishing Joining Points

While the aforementioned examples provide a mechanism by which platooning plans are made in view of cooperative routing, in order to platoon, vehicles need to establish appropriate waypoints at which to form platoons and begin driving as a platoon. A manual mechanism for establishing these joining points or meeting points may include searching maps of a region, communication, and coordination between vehicles, which is time consuming and inefficient. Further, this process must ensure that the selected joining points are located in the right places along the routes and that the vehicles can reach their destinations according to the estimated times of arrival. Platoon formation may include en-route formation where platoons are formed without vehicles stopping, and stand-still formation where vehicles meet at a fixed location and depart the location as a platoon. The establishment of joining points as described below may preferably relate to stand-still platoon formation; however, embodiments may be implemented for en-route formation where joining points are established as portions of a route along which vehicles may join together to form a platoon.

Joining points should satisfy certain criteria to be considered as appropriate joining points for starting a platoon. Factors to consider for joining points may include whether they are accessible and eligible for the considered vehicle type. For example, large trucks may not be able to easily maneuver through narrow roadways or residential areas, and upon arrival may have nowhere to park. Joining points for large trucks may require ample parking and wide roadways for access. Another factor to consider may include proximity to roadways along which the platoon will travel, and accessibility to those roadways in a reasonable time to avoid substantial deviations from a direct route. Joining points may need to offer proper exits and entrances to/from the road in order to allow vehicles in a platoon to maneuver in a safe manner.

Embodiments provided herein may provide a routing engine, such as the routing engine embodied by platoon matching exchange server 32 with the ability to automate the search of such joining points and guide vehicles to the appropriate joining point at the scheduled joining time. These joining points may be pre-defined formation points and can be described as platooning meeting points identified as a type of waypoint. The server of example embodiments may access a collection of formation points which are suitable for platooning purposes which may be stored, for example, in memory 24. The formation points may include properties that indicate characteristics of the formation point, such as accessibility and parking availability for large vehicles. Other properties which may be included may provide for conveniences such as restrooms, fuel stations, charging stations, etc. The routing engine of the server may identify candidate formation points for a vehicle along a vehicle's route that corresponds with properties of the vehicle. The routing solution may calculate deviations from the original vehicle routes to the formation points and establish if the formation point is within a predefined limit of distance or time to the original route to be considered as a joining point for that route. The evaluation of whether a formation point may be a joining point may be based on the efficiency realized by joining the platoon and the cost (e.g., distance and time) of reaching the joining point.

FIG. 8 illustrates an example embodiment in which a first vehicle 50 travels along a first route 52 while a second vehicle 54 travels along a second route 56. Both vehicles begin their respective routes at different origins and have different destinations. However, as described above, a platooning plan may recognize the available improvement to efficiency through a platoon formed by the first vehicle 50 and the second vehicle 54, and a new route deviating from the original route for one or both vehicles may be generated. As shown in FIG. 9, the first vehicle has an original route 52, and a revised route 58 that is part of the platooning plan which overlaps with the route 56 of vehicle 54 of FIG. 8. As a result, the new route for vehicle 50 includes a segment 62 that will be driven in platoon formation as shown in FIG. 10.

Once the platooning plan has been generated, a joining point for the vehicles needs to be identified. The routing engine may identify along the segment 62 formation points that are potential candidates for joining points. FIG. 11 illustrates a boundary 64 (e.g. a predetermined region around segment 62) within which formation points are searched to find potential joining points for the platoon. The boundary 64 may be determined based on a predetermined travel time or distance from the segment 62. Further, as shown in FIG. 11, the boundary 64 need not encompass the entirety of the segment 62, as there may be a point along segment 62 beyond which platoon formation is no longer advantageous. As such, the boundary 64 may be limited to a first portion of the segment 62. The formation points within the boundary 64 may be scored based on criteria to identify a preferred joining point. The scoring may optionally include preferences associated with one or both of the vehicles of the platoon. Criteria may include: distance from the segment 62 to the formation point, with closer points being preferable; travel time from the segment 62 to the formation point with the shorter time being preferable; and the distance from the beginning of segment 62, with the shorter distance being preferable such that the platoon can be driven for a greater distance along segment 62. Once the optimum formation point is obtained, it may be set as the joining point for the vehicles 50 and 54 to meet to form the platoon. The routing engine forms updated routes for both vehicles such that they reach the joining point. The joining point may be identified to both vehicles, and route guidance to the joining point may be provided.

Segmentation of Routes

The various routes of different vehicles in a platooning plan may include a plurality of segments of the respective routes, where driving context, regulations, and vehicle control can be different among the different segments of a route. While a vehicle may be driven according to a first set of regulations relating to a road segment along that road segment, once the vehicle joins a platoon the regulations may change, and rules pertaining to the platoon may alter how the vehicle is driven. In order to distinguish the rules and regulations applied to a particular vehicle along a road and in different contexts (e.g., platooning or not platooning), the different segments may require definition. Embodiments described herein provide a route segmentation method that distinguishes segments of a route in order to identify the distinct rules and regulations that may apply along the different segments.

FIG. 12 illustrates an example embodiment of segmentation of the routes of a platooning plan using the platooning plan of FIG. 7. As shown, the routes of vehicles 29, 30, and 31 are identified by segments. Segmentation points are established along each route where a segment will begin or end. The segmentation points are established where the route experiences a change, such as when the route reaches a joining point or a break point for platooning. As shown, the route of the first vehicle 29 encounters all segmentation points of the routes for the three vehicles 29, 30, and 31. The segmentation points include point G, where the second vehicle 30 joins up with the first vehicle 29 to begin platooning. The second segmentation point H is established at the break point where the second vehicle 30 separates from or breaks off of the route of the first vehicle 29. Segmentation point I is established where the third vehicle 31 joins the first vehicle 29 to form a platoon, and segmentation point J is established where the third vehicle breaks off of the route of the first vehicle.

Based on the segmentation points, route segments may be established. The first vehicle 29 traveling between point A and point B includes segment 2 between point A and point G, segment 3 between point G and point H, segment 5 between points H and I, segment 7 between point I and point J, and segment 8 between point J and point B. The route of the second vehicle 30 includes segment 1 between point C and point G, segment 3 between point G and point H, shared with the first vehicle 29, and segment 4 between point H and point D. The route of the third vehicle 31 includes segment 6 between point E and point I, segment 7 between point I and point J, shared by the first vehicle 29, and segment 9 between point J and point F.

Each of the segments of the three vehicles identified in FIG. 12 may include different regulations and rules for the vehicles traveling along the respective segments. Each route segment established in the platooning plan may have data associated therewith related to the route segment, including a starting point of the respective segment, an ending point of the respective segment, a distance of the segment, travel time of the segment, road properties of the segment, and regulations associated with the segment. Timing information may also be provided for each segment, including when each segment is to be traversed by the platoon, or the timing of arrival at a start point of the segment, such as the timing of a joining of vehicles to form a platoon. Further, the platooning regulations associated with a segment may have a time component, where the platooning regulations change based on a time of day, day of week, or time of year, for example. This data may be stored as part of the platooning plan, such as in memory 24 of apparatus 20, at platoon matching exchange server 32, or stored locally with a respective vehicle traveling along the respective route of the platooning plan.

The data may include a segment identifier, unique to the segment. The data may also include the latitude/longitude of where the segment starts and where the segment ends, link identifiers of road links of the segment and of the start point and end point. Beyond the data and information relating to the road segment itself, data may also include regulations relating to the travel of the vehicle along the route. For example, the segment data may include a platoon plan including identifying vehicles with which a vehicle is platooning along the segment, a vehicle order in the platoon, a minimum and/or maximum separation/following distance between vehicles in the platoon along the segment, maximum number of platooning vehicles permitted along the segment, minimum and/or maximum speed permitted for platoons along the segment, one or more times at which a vehicle is to reach one or more points along the segment, or other data relating to vehicle travel along the respective segment.

Platooning plans may change frequently for a variety of reasons. For example, more vehicles may be added to a platoon which may impact the platooning plan of existing vehicles, weather conditions may influence platooning plans, road conditions, vehicles delayed from participating in the platoon, etc. Embodiments described herein provide an efficient manner of manipulating a platooning plan on a segment level such that platooning plan changes may only be applied to segments that are affected by the changes to the platooning plan.

FIG. 13 illustrates an example embodiment of splitting segments of a route in the formation of a platooning plan. As shown, a first vehicle 29 has a route to travel between point A to point B along segment 2. A second vehicle 30 has a route to travel between point C and point D along segment 1. The platoon matching exchange server 32 may identify a platooning plan that is more efficient than separate routes for the vehicles. The platooning plan is illustrated where the route of the first vehicle 29 is rerouted to overlap the route of the second vehicle 30. As shown, the route of the first vehicle becomes a sequence of segments, including segment 2, segment 3, and segment 5 to route from point A to point B. While the route of the second vehicle 30 remains unchanged, the route is segmented as the vehicle will be platooning along a portion of the route. The platooning route of the second vehicle 30 includes segment 1, segment 3, and segment 4, where segment 3 overlaps with the route of the first vehicle 29 and the first vehicle and the second vehicle form a platoon along segment 3.

FIG. 14 illustrates an example in which a platooning plan is changed to separate the routes of the first vehicle 29 and the second vehicle 30. This may occur for a variety of reasons, primarily in which the efficiency benefit between the vehicles gained by platooning is no longer an improvement over separate routing. This may occur when there is traffic along a road segment that affects the route of one or both vehicles, a delay is otherwise incurred by one of the vehicles, or regulations change, such as when platooning is not allowed along a road segment during certain hours (e.g., rush hour) or during certain weather conditions (e.g., rain, snow, or fog), and the timeline for the platooning plan encroaches those hours or the weather changes to a condition in which platooning is not permitted.

The differences between road segments may include rules and/or regulations that alter how a road segment is driven. For example, a vehicle may be manually driven or semi-autonomously driven along a first road segment, such as the second vehicle 30 along segment 1 in FIG. 12. Upon reaching joining point G with the first vehicle 29, the two vehicles may form a platoon along segment 3. The second vehicle 30 may be required to change from manual or semi-autonomous vehicle control to autonomous vehicle control based on a regulation for the segment if, for example, the road segment requires autonomous driving for platoons. Further, maximum and minimum speeds may change between segment 1 and segment 2 based on the formation of a platoon, regardless of what the maximum and minimum speeds are for the road links of segment 3 when a vehicle is not driving in a platoon. Thus, the vehicle speed regulations, vehicle weight regulations, platooning formation regulations (e.g., following distance, number of vehicles) may be segment dependent based on the platooning plan. The regulations and rules for each segment may be communicated to a driver of the respective vehicle, or to an advanced driving assistance system of a vehicle by, for example, the platoon matching exchange server 32, and may be presented to a driver on a user interface.

Driving Clearance for Platooning

As platooning may provide the ability for vehicles to travel in a semi-autonomous or autonomous manner through a virtual link or "electronic tow-bar", driving or control of the lead vehicle may incur additional responsibility while following or trailing vehicles may rely largely on the actions of the lead vehicle. For example, a lead vehicle may be manually driven or semi-autonomously driven having a driver for feedback and control. Trailing vehicles may use autonomous or semi-autonomous control to maintain following distances and to follow the lead of the vehicle in front of them. This may be performed by one or both of sensors of the trailing vehicle providing information regarding a vehicle they are following, or the vehicle they are following and the lead vehicle may provide information via communication link to the trailing vehicle regarding path, following distance, speed, braking, evasive maneuvers, etc.

As the trailing vehicles in a platoon may require very close following distances to realize their full efficiency improvement, autonomous or semi-autonomous control may be necessary to maintain a close following distance while also being able to brake effectively when a standard following distance/time required by a human may not be available. As the gap between a trailing vehicle and a vehicle being followed may be very narrow, the time required for a human driver to react from the moment a braking event was signaled and acknowledged until the human can apply the brakes reactively may be too long, thereby requiring at least some degree of autonomy for safety. Thus, in a platoon formation, safety actions may be handled by a platoon system and autonomous vehicle controls of a vehicle. Embodiments provided herein provide information to drivers and platoon systems that relate to whether platooning is permitted or recommended, and how platooning should be performed along a road segment.

In order for autonomous vehicle control or semi-autonomous vehicle control in a platoon to be effective, the platoon system may benefit from an awareness of the surrounding road conditions. Embodiments described herein provide platooning systems and vehicles of the platoon with information that is passed to drivers and fleet dispatchers about road conditions and restrictions in order to adapt the platooning drive and formations accordingly. Further, the driving clearance system for platooning described herein may provide input to route coordination and dispatching systems for fleets or for platoon formation optimization, thus helping the optimization of schedules and driven routes.

The driving clearance system for platooning as described herein is a tool that provides information regarding whether platooning is permitted along a given portion of a road network, and if so, the relevant restrictions and rules relating to platooning along the given portion. The information may be processed and used by three target audiences: vehicles that may participate in a platoon, drivers of those vehicles, and dispatch/fleet coordination systems.

Embodiments described herein may provide information relating to road segments and links relating to static information, semi-dynamic information, and dynamic information. Static information may include regulations about platooning on a particular road segment, such as whether platooning is allowed, minimum/maximum speeds of platoons, total platoon length, total platoon weight, minimum/maximum following distances, etc. The static information for a road segment may not change or may very rarely change; however, the static information may be dependent upon other types of information, such as following distances may be different for different contexts, such as longer following distances required at night or during inclement weather, for example. Semi-dynamic information may be any kind of road status information that is persistent for a temporary period and to the extent possible, planned. This information may include road construction, detours, closures, etc. Dynamic information may depend on factors not directly related to the road network itself and that may happen spontaneously, such as traffic density, weather, road surface information, etc.

The static, semi-dynamic, and dynamic information of example embodiments may be used to provide platooning instructions with regard to various aspects of platooning, such as platoon speed, following distance, platoon total weight, platoon total length, number of vehicles in the platoon, etc. Embodiments provided herein aggregate information from a plurality of sources regarding platooning clearance and conditions for a predetermined road (segment or link), along a given route of a vehicle, and within a specified area. This aggregation and analysis of information is used to establish a comprehensive platooning clearance plan to communicate to the vehicles of a platoon.

FIG. 15 illustrates a block diagram of the components and message flow of a system of the example embodiments described herein. As shown, map data 102 may be stored in a database and include road information such as the types of road and relevant information such as curvature, topography, maximum heights and widths, etc. A data gatherer 104 may extract data from various sources or scrape data from network elements for regulatory data, traffic, weather, etc. This information may come from an external database 106 which may provide static information, or other external sources 108 which may provide semi-dynamic and dynamic information as needed. Data storage 128 may be a database to store the data gathered by the data gatherer 104 and may store static, semi-dynamic, and even dynamic information. The semi-dynamic and dynamic data may be periodically updated based on a time period relevant to the information, where information that changes more often (e.g., traffic and weather) may have a shorter update period than information that changes more slowly (e.g., road closures). The data storage 128 may also track historical events and update such events as needed. Such historical tracking may provide input to a machine learning system in which traffic information may be predicted based on other factors, such as weather or historical events and may become predictive rather than reactive, or some combination thereof.

Embodiments may include a rules engine 112 that may include rules which identify whether platooning is allowed, under what circumstances platooning is allowed, and what platooning parameters are applicable. The rules of the rules engine 112 may be modifiable based on information associated with a road segment, which may be provided, for example, by a municipality or governmental body, such as a department of transportation. An application programming interface (API) 114 may enable external actors 116 to query the system for platooning clearance 118 on a given time and date for a particular road segment, along a given route of a vehicle, and/or within a specified area. The processing circuitry 126 may process the input of the API 114 request to aggregate the relevant information from the existing information sources, query the rules engine to extract the applicable rules for the aggregated data, and articulate a response for the relevant type of data. The aggregated data and rules may be applied by the processor 22 in order to generate a response to the platooning clearance request 118.

The platooning clearance information 124 generated by example embodiments described herein may be provided to a driver or user of an autonomous/semi-autonomous vehicle, and/or to the vehicle itself, such as to an advanced driving assistance system to inform an autonomous or semi-autonomous vehicle regarding the platooning clearance information. When informing a vehicle of the platooning clearance information, the information may not require visualization for presentation as the advanced driver assistance system can interpret the information. However, when communicating the platooning clearance information to a user or driver, such as from a fleet dispatcher, the information may be visually presented to provide meaningful and easily interpreted information to the driver. FIG. 16 illustrates an example embodiment in which a platooning clearance request is made for a road segment 200 using, for example, the architecture of FIG. 15. The platooning clearance information may be returned as shown in FIG. 16 in which the road segment 200 is visually presented together with the platooning clearance information 124. In this instance, the platooning clearance information includes that platooning is permitted along road segment 200, with a speed range of 70-90 kilometers per hour, a following distance of between 5 and 10 meters, a maximum total weight of 40 tons, and a maximum total length of 200 meters. More or less platoon clearance information may be provided as appropriate.

FIG. 17 illustrates another example embodiment of road segment 200 in a scenario in which the semi-dynamic information regarding the road segment indicates road work is present. In such a scenario, platooning may not be permitted as illustrated in platooning clearance information 124. Thus, no further platooning rules/restrictions need to be communicated regarding road segment 200 since they do not apply when a vehicle is not driving in a platoon. Various other visual user interfaces may be used to provide platooning clearance information to a user such that they may follow the platooning restrictions as appropriate.

FIG. 18 illustrates an example flowchart of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus.

As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s).

The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 18, when executed, convert a computer or processing circuitry into a particular machine configured to perform an example embodiment of the present invention. Accordingly, the operations of FIG. 18 define an algorithm for configuring a computer or processing to perform an example embodiment. In some cases, a general purpose computer may be provided with an instance of the processor which performs the algorithms of FIG. 18 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 18 is an example flowchart illustrating a method of generating a platooning plan in which the routes are generated in a manner that one route influences the generation of another route in a symbiotic manner to improve an overall efficiency of all vehicles traveling in the platoon. As shown, at 110 a first trip request is received including a vehicle identification, a first trip origin, and a first trip destination. A second trip request is received at 120 including a second vehicle identification, a second trip origin, and a second trip destination. A platooning plan is generated at 130 to include a first route associated with the first vehicle identification and a second route associated with the second vehicle identification, where the first route and the second route overlap. At least one of the first route and the second route is generated with an influence from the other of the first route or the second route. At 140, the first route is provided to a first vehicle associated with the first vehicle identification and the second route is provided to a second vehicle associated with the second vehicle identification.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, by a platoon matching exchange server, a first trip request including a first vehicle identification, a first trip origin, and a first trip destination;
   determining a first projected efficiency of a first vehicle associated with the first vehicle identification along a direct route between the first trip origin and the first trip destination;
   receiving, by the platoon matching exchange server, a second trip request including a second vehicle identification, a second trip origin, and a second trip destination, wherein the first trip origin is different from the second trip origin, and wherein the first trip destination is different from the second trip destination;
   determining a second projected efficiency of a second vehicle associated with the second vehicle identification along a direct route between the second trip origin and the second trip destination;
   generating, by the platoon matching exchange server, a platooning plan that includes a first route associated with the first vehicle identification and a second route associated with the second vehicle identification, wherein the first route and the second route overlap for at least a portion of the respective route, wherein at least one of the first route and the second route are generated with an influence from the other of the first route and the second route based on a cumulative projected platoon efficiency, wherein a first route projected efficiency of the first vehicle along the first route is below the first projected efficiency, wherein a second route projected efficiency of the second vehicle along the second route is above the second projected efficiency, and wherein the cumulative projected platoon efficiency of the first vehicle along the first route and the second vehicle along the second route is greater than a cumulative projected efficiency of the first projected efficiency and the second projected efficiency;

providing, by the platoon matching exchange server, the first route to the first vehicle associated with the first vehicle identification and the second route to the second vehicle associated with the second vehicle identification; and providing, by the platoon matching exchange server, route guidance to the first vehicle along the first route and to the second vehicle along the second route.

2. The method of claim 1, wherein the platooning plan comprises a joining location where the first route begins to overlap the second route.

3. The method of claim 2, wherein the platooning plan comprises a departing location where the first route ceases to overlap the second route.

4. The method of claim 2, wherein the platooning plan comprises a schedule including a departure time for the first route, a departure time for the second route, and a joining time, wherein the joining time is a scheduled time of arrival of the first vehicle and the second vehicle at the joining location.

5. The method of claim 1, further comprising:
receiving, by the platoon matching exchange server, an indication that at least one of the first vehicle and the second vehicle is deviating from:
  (a) the first route or the second route, or
  (b) a schedule associated with a respective one of the first route or the second route;
generating, by the platoon matching exchange server, a revised platooning plan that includes a first revised route associated with the first vehicle identification and a second revised route associated with the second vehicle identification; and
providing, by the platoon matching exchange server, the revised first route to the first vehicle and the revised second route to the second vehicle.

6. The method of claim 1, wherein the platooning plan is generated based on acceptable trip parameters for the first vehicle and the second vehicle, and wherein the acceptable trip parameters comprise waypoints, types of roadways, planned route, planned stops, expected speed, current position, fuel economy, vehicle dynamics properties and preferences regarding a platoon.

7. The method of claim 1, wherein the route guidance comprises a navigational information to follow a route, information pertaining to platooning and vehicle control.

8. An apparatus comprising at least one processor and at least one memory including computer program code, the at least one memory and the computer program code configured to, with the processor, cause the apparatus to at least:
receive, by a platoon matching exchange server, a first trip request including a first vehicle identification, a first trip origin, and a first trip destination;
determine a first projected efficiency of a first vehicle associated with the first vehicle identification along a direct route between the first trip origin and the first trip destination;
receive, by the platoon matching exchange server, a second trip request including a second vehicle identification, a second trip origin, and a second trip destination, wherein the first trip origin is different from the second trip origin, and wherein the first trip destination is different from the second trip destination;
determine a second projected efficiency of a second vehicle associated with the second vehicle identification along a direct route between the second trip origin and the second trip destination;
generate, by the platoon matching exchange server, a platooning plan that includes a first route associated with the first vehicle identification and a second route associated with the second vehicle identification, wherein the first route and the second route overlap for at least a portion of the respective route, wherein at least one of the first route and the second route are generated with an influence from the other of the first route and the second route based on a cumulative projected platoon efficiency, wherein a first route projected efficiency of the first vehicle along the first route is below the first projected efficiency, wherein a second route projected efficiency of the second vehicle along the second route is above the second projected efficiency, and wherein the cumulative projected platoon efficiency of the first vehicle along the first route and the second vehicle along the second route is greater than a cumulative projected efficiency of the first projected efficiency and the second projected efficiency;
provide, by the platoon matching exchange server, the first route to the first vehicle associated with the first vehicle identification and the second route to the second vehicle associated with the second vehicle identification, and
provide, by platoon matching exchange server, route guidance to the first vehicle along the first route and to the second vehicle along the second route.

9. The apparatus of claim 8, wherein the platooning plan comprises a joining location where the first route begins to overlap the second route.

10. The apparatus of claim 9, wherein the platooning plan comprises a departing location where the first route ceases to overlap the second route.

11. The apparatus of claim 9, wherein the platooning plan comprises a schedule including a departure time for the first route, a departure time for the second route, and a joining time, wherein the joining time is a scheduled time of arrival of the first vehicle and the second vehicle at the joining location.

12. The apparatus of claim 8, wherein the apparatus is further caused to:
receive, by the platoon matching exchange server, an indication that at least one of the first vehicle and the second vehicle is deviating from:
  (a) the first route or the second route, or
  (b) a schedule associated with a respective one of the first route or the second route;
generate, by the platoon matching exchange server, a revised platooning plan that includes a first revised route associated with the first vehicle identification and a second revised route associated with the second vehicle identification; and
provide, by the platoon matching exchange server, the revised first route to the first vehicle and the revised second route to the second vehicle.

13. The apparatus of claim 8, wherein the platooning plan is generated based on acceptable trip parameters for the first vehicle and the second vehicle, and wherein the acceptable trip parameters comprise waypoints, types of roadways, planned route, planned stops, expected speed, current position, fuel economy, vehicle dynamics properties and preferences regarding a platoon.

14. The apparatus of claim 8, wherein the route guidance comprises a navigational information to follow a route, information pertaining to platooning and vehicle control.

15. A computer program product comprising at least one non-transitory computer-readable storage medium having computer-executable program code portions stored therein, the computer-executable program code portions comprising program code instructions to:

receive, by a platoon matching exchange server, a first trip request including a first vehicle identification, a first trip origin, and a first trip destination;

determine a first projected efficiency of a first vehicle associated with the first vehicle identification along a direct route between the first trip origin and the first trip destination;

receive, by the platoon matching exchange server, a second trip request including a second vehicle identification, a second trip origin, and a second trip destination, wherein the first trip origin is different from the second trip origin, and wherein the first trip destination is different from the second trip destination;

determine a second projected efficiency of a second vehicle associated with the second vehicle identification along a direct route between the second trip origin and the second trip destination;

generate, by the platoon matching exchange server, a platooning plan that includes a first route associated with the first vehicle identification and a second route associated with the second vehicle identification, wherein the first route and the second route overlap for at least a portion of the respective route, wherein at least one of the first route and the second route are generated with an influence from the other of the first route and the second route based on a cumulative projected platoon efficiency, wherein a first route projected efficiency of the first vehicle along the first route is below the first projected efficiency, wherein a second route projected efficiency of the second vehicle along the second route is above the second projected efficiency, and wherein the cumulative projected platoon efficiency of the first vehicle along the first route and the second vehicle along the second route is greater than a cumulative projected efficiency of the first projected efficiency and the second projected efficiency;

provide, by the platoon matching exchange server, the first route to the first vehicle associated with the first vehicle identification and the second route to the second vehicle associated with the second vehicle identification, and provide, by the platoon matching exchange server, route guidance to the first vehicle along the first route and to the second vehicle along the second route.

16. The computer program product of claim 15, wherein the platooning plan comprises a joining location where the first route begins to overlap the second route.

17. The computer program product of claim 16, wherein the platooning plan comprises a departing location where the first route ceases to overlap the second route.

18. The computer program product of claim 16, wherein the platooning plan comprises a schedule including a departure time for the first route, a departure time for the second route, and a joining time, wherein the joining time is a scheduled time of arrival of the first vehicle and the second vehicle at the joining location.

19. The computer program product of claim 15, further comprising program code instructions to:

receive, by the platoon matching exchange server, an indication that at least one of the first vehicle and the second vehicle is deviating from:
(a) the first route or the second route, or
(b) a schedule associated with a respective one of the first route or the second route;

generate, by the platoon matching exchange server, a revised platooning plan that includes a first revised route associated with the first vehicle identification and a second revised route associated with the second vehicle identification; and provide, by the platoon matching exchange server, the revised first route to the first vehicle and the revised second route to the second vehicle.

20. The computer program product of claim 15, wherein the platooning plan is generated based on acceptable trip parameters for the first vehicle and the second vehicle, and wherein the acceptable trip parameters comprise waypoints, types of roadways, planned route, planned stops, expected speed, current position, fuel economy, vehicle dynamics properties and preferences regarding a platoon.

* * * * *